United States Patent
Naganuma

(10) Patent No.: US 11,184,590 B2
(45) Date of Patent: Nov. 23, 2021

(54) IMAGE PROCESSING APPARATUS AND METHOD

(71) Applicant: SONY CORPORATION, Tokyo (JP)

(72) Inventor: Hiromasa Naganuma, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/486,693

(22) PCT Filed: Mar. 2, 2018

(86) PCT No.: PCT/JP2018/008054
§ 371 (c)(1),
(2) Date: Aug. 16, 2019

(87) PCT Pub. No.: WO2018/168528
PCT Pub. Date: Sep. 20, 2018

(65) Prior Publication Data
US 2020/0059632 A1    Feb. 20, 2020

(30) Foreign Application Priority Data
Mar. 17, 2017 (JP) .............................. JP2017-052119

(51) Int. Cl.
*H04N 9/31* (2006.01)
*H04N 5/04* (2006.01)

(52) U.S. Cl.
CPC ............. *H04N 9/3147* (2013.01); *H04N 5/04* (2013.01); *H04N 9/3194* (2013.01)

(58) Field of Classification Search
CPC ............ G01B 11/2545; G01B 11/2504; H04N 13/398; H04N 5/04
See application file for complete search history.

(56) References Cited

U.S. PATENT DOCUMENTS

| | | | |
|---|---|---|---|
| 2007/0091201 A1* | 4/2007 | Sasaki | G03B 21/26 348/362 |
| 2008/0309884 A1* | 12/2008 | O'Dor | H04N 9/3147 353/7 |
| 2015/0177608 A1 | 6/2015 | Nelson | |

FOREIGN PATENT DOCUMENTS

| | | |
|---|---|---|
| CN | 1976445 A | 6/2007 |
| CN | 103430555 A | 12/2013 |

(Continued)

OTHER PUBLICATIONS

International Search Report and Written Opinion of PCT Application No. PCT/JP2018/008054, dated May 22, 2018, 10 pages of ISRWO.

(Continued)

*Primary Examiner* — Samira Monshi
(74) *Attorney, Agent, or Firm* — Chip Law Group

(57) ABSTRACT

The present disclosure relates to an image processing apparatus and method that make it possible to achieve synchronization between a plurality of image projections with increased accuracy. Synchronization between a plurality of projection sections is controlled so as to suppress disruption of image projection timing between the projection sections in accordance with pixel values of captured images that are obtained by allowing an imaging section to capture projection images projected to the same position by the projection sections. The present disclosure is applicable, for example, to an image processing apparatus, an image projection apparatus, a control apparatus, an information processing apparatus, an image projection system, an image processing method, or a program.

14 Claims, 13 Drawing Sheets

(56) References Cited

FOREIGN PATENT DOCUMENTS

| | | |
|---|---|---|
| CN | 104781722 A | 7/2015 |
| JP | 2008-051848 A | 3/2008 |
| JP | 2009-122412 A | 6/2009 |
| JP | 2014-077933 A | 5/2014 |
| JP | 2014-106386 A | 6/2014 |
| JP | 2016-225922 A | 12/2016 |
| WO | 2015/075937 A1 | 5/2015 |

OTHER PUBLICATIONS

Office Action for CN Patent Application No. 201880017098.8, dated Jul. 1, 2021, 13 pages of Office Action and 14 pages of English Translation.
Hong, et al., "The principle and realization method for the synchronization of high-speed image projection and acquisition in dynamic 3D measurement", Modem Manufacturing Engineering, No. 04, Apr. 28, 2015, 6 pages.

* cited by examiner

IMAGE PROCESSING APPARATUS AND METHOD

CROSS REFERENCE TO RELATED APPLICATIONS

This application is a U.S. National Phase of International Patent Application No PCT/JP2018/008054 filed on Mar. 2, 2018, which claims priority benefit of Japanese Patent Application No. JP 2017-052119 filed in the Japan Patent Office on Mar. 17, 2017. Each of the above-referenced applications is hereby incorporated herein by reference in its entirety.

TECHNICAL FIELD

The present disclosure relates to an image processing apparatus and method, and more particularly to an image processing apparatus and method that make it possible to achieve synchronization between a plurality of image projections with increased accuracy.

BACKGROUND ART

A related-art method (refer, for example, to PTL 1) devised for synchronizing a plurality of projectors achieves synchronization between the projectors by attaching a camera to each projector, allowing the camera attached to one projector to capture a projection image projected by another projector, checking the captured image to determine whether the projected image contains a synchronization signal, and synchronizing the projectors in accordance with the result of the check.

CITATION LIST

Patent Literature

[PTL 1]
Japanese Patent Laid-open No. 2014-106386

SUMMARY

Technical Problem

However, when the above method is used, the accuracy of synchronization depends on the frame rate of imaging by a camera. Thus, synchronization cannot be achieved with increased accuracy. Consequently, it is difficult to achieve synchronization with sufficiently high accuracy by using the above method.

The present disclosure has been made in view of the above circumstances, and makes it possible to synchronize a plurality of image projections with increased accuracy.

Solution to Problem

An image processing apparatus according to an aspect of the present technology includes a synchronization control section that controls synchronization between a plurality of projection sections in such a manner as to suppress disruption of image projection timing between the projection sections in accordance with pixel values of captured images that are obtained by allowing an imaging section to capture projection images projected to the same position by the projection sections.

The synchronization control section may control the synchronization between the plurality of projection sections in such a manner as to maximize, in the captured images captured by the imaging section in synchronization with one of the projection sections, absolute values of embedded values contained in the projected images onto which a positive value and a negative value are alternately projected by another projection section among the plurality of projection sections.

In the captured images captured by the imaging section, the synchronization control section may control the synchronization between the projection sections in such a manner as to minimize a difference between the projected images and a result of combination of a plurality of projected images containing different pattern images.

The image processing apparatus may further include a calculation section that calculates a value of a parameter representing the disruption of image projection timing between the projection sections in accordance with the pixel values of the captured images, in which the synchronization control section controls the synchronization between the projection sections in such a manner as to suppress the disruption of image projection timing between the projection sections in accordance with the value of the parameter that is calculated by the calculation section.

The calculation section may calculate a difference between the plurality of successively captured images as the parameter, and the synchronization control section may control the synchronization between the projection sections in such a manner as to maximize the difference calculated by the calculation section.

The calculation section may calculate, as the parameter, a difference between the projected images contained in the captured images and a result of combination of different pattern images projected by the plurality of projection sections, and the synchronization control section may control the synchronization between the projection sections in such a manner as to minimize the difference calculated by the calculation section.

The calculation section may calculate the result of combination by using captured images of projected images containing different pattern images.

The image processing apparatus may further include an image processing section that performs image processing on images projected by the plurality of projection sections in order to control the synchronization between the projection sections, in which the synchronization control section is configured to control the synchronization between the projection sections in such a manner as to suppress the disruption of image projection timing between the projection sections in accordance with pixel values of the captured images subjected to image processing by the image processing section.

The image processing section may embed a positive value and a negative value into the same image, and causes the projection sections to project an image having the positive embedded value and an image having the negative embedded value.

The image processing apparatus may further include an imaging section that captures images of the projected images to acquire the captured images.

The imaging section may synchronize with one of the plurality of projection sections and acquires the captured images by making an exposure during a period of image projection by the projection sections.

The imaging section may acquire the captured images by making an exposure for a period having the same duration as the period of image projection by the projection sections.

The imaging section may capture an image of each of projected images containing a plurality of different pattern images used for synchronization control by the synchronization control section.

The image processing apparatus may further include a projection section that projects an image.

The projection section may alternately project an image having a positive embedded value and an image having a negative embedded value.

The projection section may sequentially project a plurality of pattern images.

The projection section may project each of the plurality of pattern images and cause the imaging section to capture each projected image before sequentially projecting the plurality of pattern images.

An image processing method according to another aspect of the present technology controls synchronization between a plurality of projection sections in such a manner as to suppress disruption of image projection timing between the projection sections in accordance with pixel values of captured images that are obtained by allowing an imaging section to capture projection images projected to the same position by the projection sections.

The image processing apparatus and the image processing method according to an aspect of the present technology control the synchronization between a plurality of projection sections in such a manner as to suppress the disruption of image projection timing between the projection sections in accordance with pixel values of captured images that are obtained by allowing an imaging section to capture projection images projected to the same position by the plurality of projection sections.

Advantageous Effects of Invention

The present disclosure makes it possible to process images. More particularly, the present disclosure makes it possible to achieve synchronization between a plurality of image projections with increased accuracy.

DESCRIPTION OF EMBODIMENTS

Modes for implementing the present disclosure (hereinafter referred to as embodiments) will now be described. The description will be given in the following order.

Figure 1:
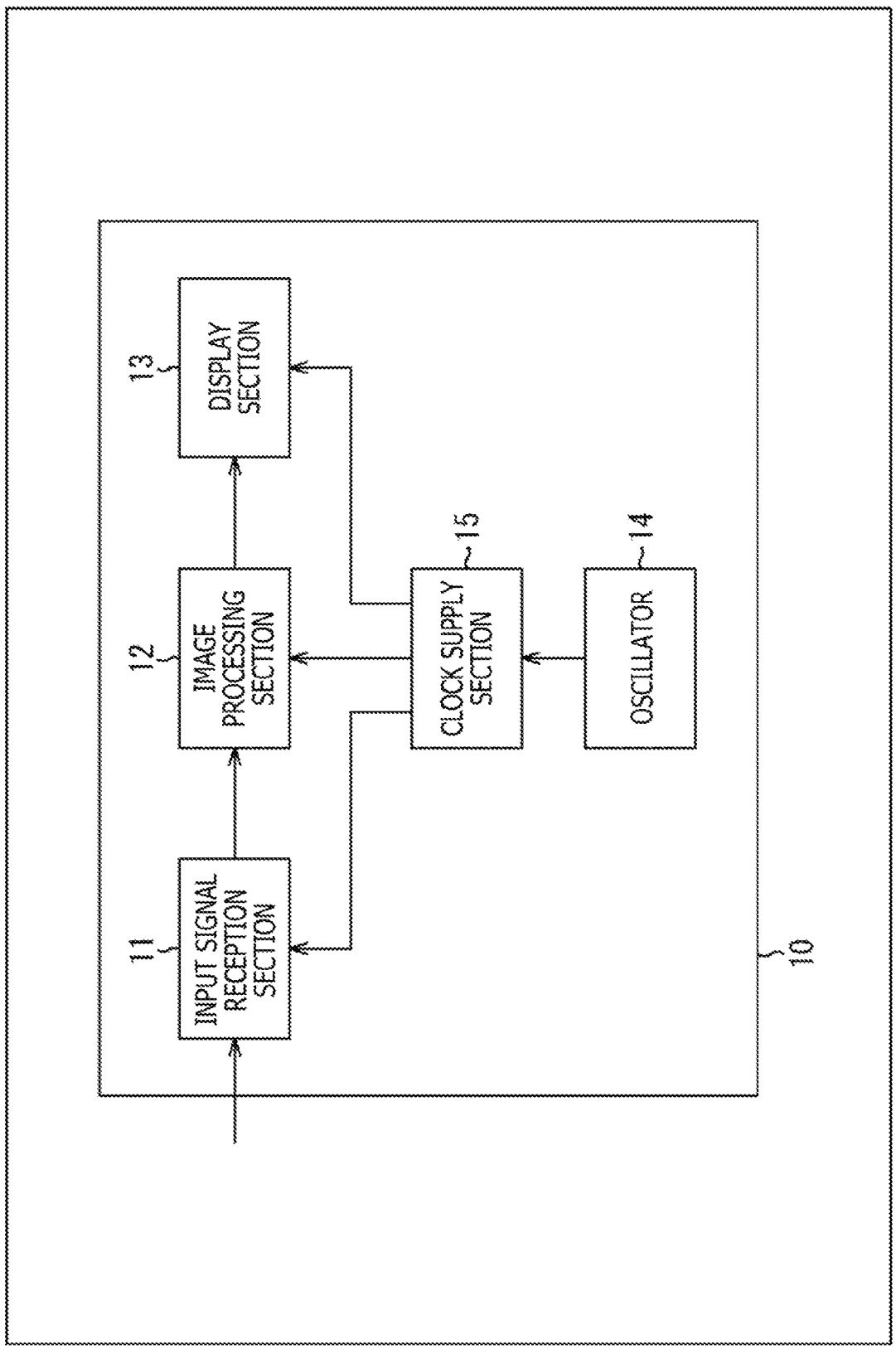
FIG. 1 is a block diagram illustrating a principal exemplary configuration of a projector.

1. Synchronization control of image projections
2. First embodiment (image projection system with imaging apparatus having known characteristics)
3. Second embodiment (image projection system with imaging apparatus having unknown characteristics)
4. Third embodiment (alternative exemplary configurations of image projection system)
5. Other 1. Synchronization Control of Image Projections Synchronization Between Projectors In general, most projectors do not directly display an inputted video signal, but convert it to their own display signal and display such a converted signal. For example, most projectors include an oscillator for an output signal for displaying their own display signals, and use the clock of the oscillator for display purposes, as depicted in FIG. 1. The reason is that, if the synchronization with the inputted video signal is perfectly achieved, a panel display operation is interrupted the moment the inputted video signal is interrupted. This results in disturbed viewing.

In a projector 10 depicted in FIG. 1, an input signal reception section 11 receives an input signal (an input image), an image processing section 12 performs predetermined image processing on the input image, and a display section 13 projects (displays) an image resulting from such image processing. These processing sections operate in synchronization with a clock signal that is generated by an oscillator 14 and supplied through a clock supply section 15.

Meanwhile, in some cases, a plurality of projectors has been used to project images. A certain method has been used, for example, to let a plurality of projectors project images to the same position, increase the brightness of the projected images, and employ a high frame rate. Further, another method has been used, for example, to increase the image size of the projected images by shifting the position of projection and increase the resolution of the projected images.

In the above instance, even if synchronization between input signals is achieved in a case where a plurality of pieces of the projector 10 configured as depicted in FIG. 1 is simultaneously used, a drawing update might not be performed at correct timing due to clock conversion at the time of display (projection) by the display section 13 depicted in FIG. 1. More specifically, the image projection timing between the plurality of pieces of the projector 10 might be disrupted. If the image projections of the plurality of pieces of the projector 10 are not synchronized, for example, the projected images of a plurality of frames might superimpose upon each other to degrade the subjective image quality of the projected images although such projected images do not superimpose upon each other in a case where synchronization is properly achieved.

If the display section 13 responds to an input signal at a sufficiently high speed, a drawing update is performed at shorter intervals than an input signal update. In such an instance, the disruption of image projection timing is not conspicuous even if it occurs at the time of clock conversion. However, a significant disruption of image projection timing, such as a disruption of approximately 1 frame, might occur in a case where the display section 13 is updated at intervals similar to the input signal update. For example, 120-Hz content is recommended, for instance, for Super Hi-Vision. Therefore, such a significant disruption of image projection timing is highly likely to occur in a case where the display section 13 is driven at 120 Hz.

A method described, for example, in PTL 1 for achieving synchronization of image projections between a plurality of projectors attaches a camera to each projector, allows the camera attached to one projector to capture a projection image projected by another projector, checks the captured image to determine whether the projected image contains a synchronization signal, and achieves synchronization between the projectors in accordance with the result of the check.

Figure 2:
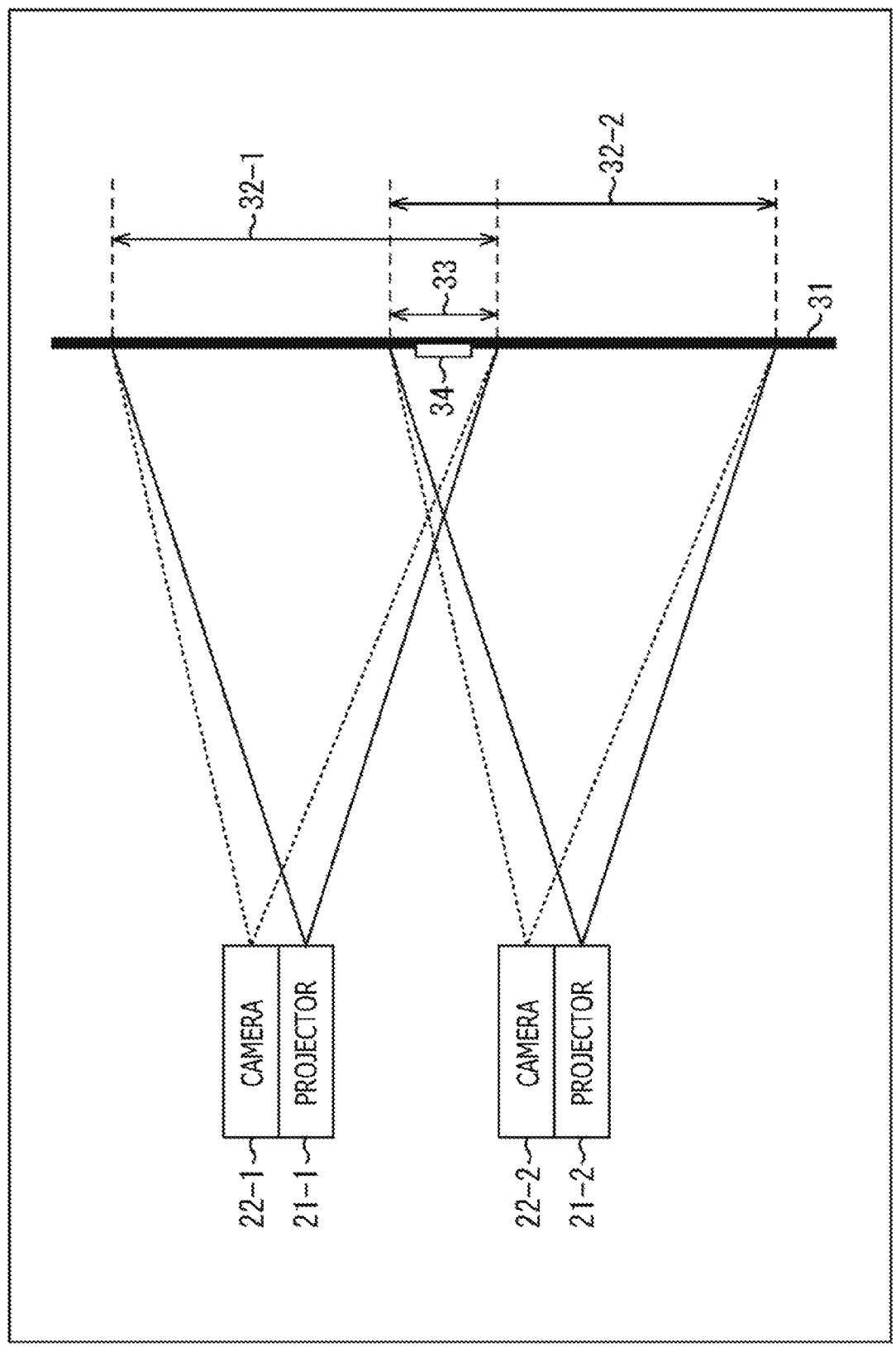
FIG. 2 is a diagram illustrating an example of how to achieve synchronization.

FIG. 2 gives an overview of the above method. As illustrated in FIG. 2, a camera 22-1 and a camera 22-2 are attached respectively to a projector 21-1 and a projector 21-2. The projector 21-1 and the projector 21-2 synchronize with each other. The projector 21-1 projects an image onto an area 32-1 of a screen 31, and the camera 22-1 captures an image of the area 32-1. Similarly, the projector 21-2 projects an image onto an area 32-2 of the screen 31, and the camera 22-2 captures an image of the area 32-2. The area 32-1 and the area 32-2 overlap with each other. The overlapping area is referred to as the area 33.

For example, the projector 21-1 projects an image containing a predetermined pattern 34 a little earlier than a timing at which the projection image is updated. The pattern 34 is projected, for example, onto the area 33 of the screen 31. When the camera 22-2 captures an image, the captured image contains the pattern 34. When the pattern 34 is detected from the captured image captured by the camera 22-2, the projector 21-2 updates, at a predetermined timing, the image to be projected. The projector 21-1 also updates, at that timing, the image to be projected. In this manner, it is possible to achieve synchronization of image projections (image updates) between the projectors 21-1 and 21-2.

However, when the above method is used, the accuracy of synchronization depends on the frame rate of imaging by the camera 22-2. More specifically, synchronization cannot be achieved with an accuracy equal to or higher than equivalent intervals at which imaging is performed by the camera 22-2. If, for example, the intervals at which imaging is performed by the camera 22-2 are equivalent to the frame rate of a moving image projected by the projector 21-1, it is possible to achieve synchronization only with an accuracy equivalent to frame units of the moving image. Therefore, in a case where, for example, a timing for updating the frame of the moving image projected by the projector 21-1 did not coincide with a timing for imaging by the camera 22-2, it has been difficult to adjust the timing with an accuracy equal to or higher than the accuracy equivalent to frame units.

If the camera 22-2 is able to perform imaging at a sufficiently high rate with respect to the frame rate of the moving image projected by the projector 21-1, the accuracy of synchronization can be sufficiently increased. However, a camera capable of performing imaging at a sufficiently high rate with respect, for example, to the aforementioned 120 Hz moving image is expensive. A cost increase caused by the use of such a high-performance camera for synchronization purposes only is not practical.

Further, in a case where the method described in PTL 1 has been used, a camera is required for each projector. Therefore, the cost might increase with an increase in the number of projectors to be synchronized.

Synchronization Control Based on Pixel Values of Captured Images

In view of the above circumstances, the synchronization between a plurality of projection sections is controlled in such a manner as to suppress the disruption of image projection timing between the projection sections in accordance with pixel values of captured images that are obtained by allowing an imaging section to capture projected images projected to the same position by the plurality of projection sections. This makes it possible to achieve synchronization between a plurality of image projections with increased accuracy while suppressing an increase in the cost.

2. First Embodiment

Image Projection System

Figure 3:
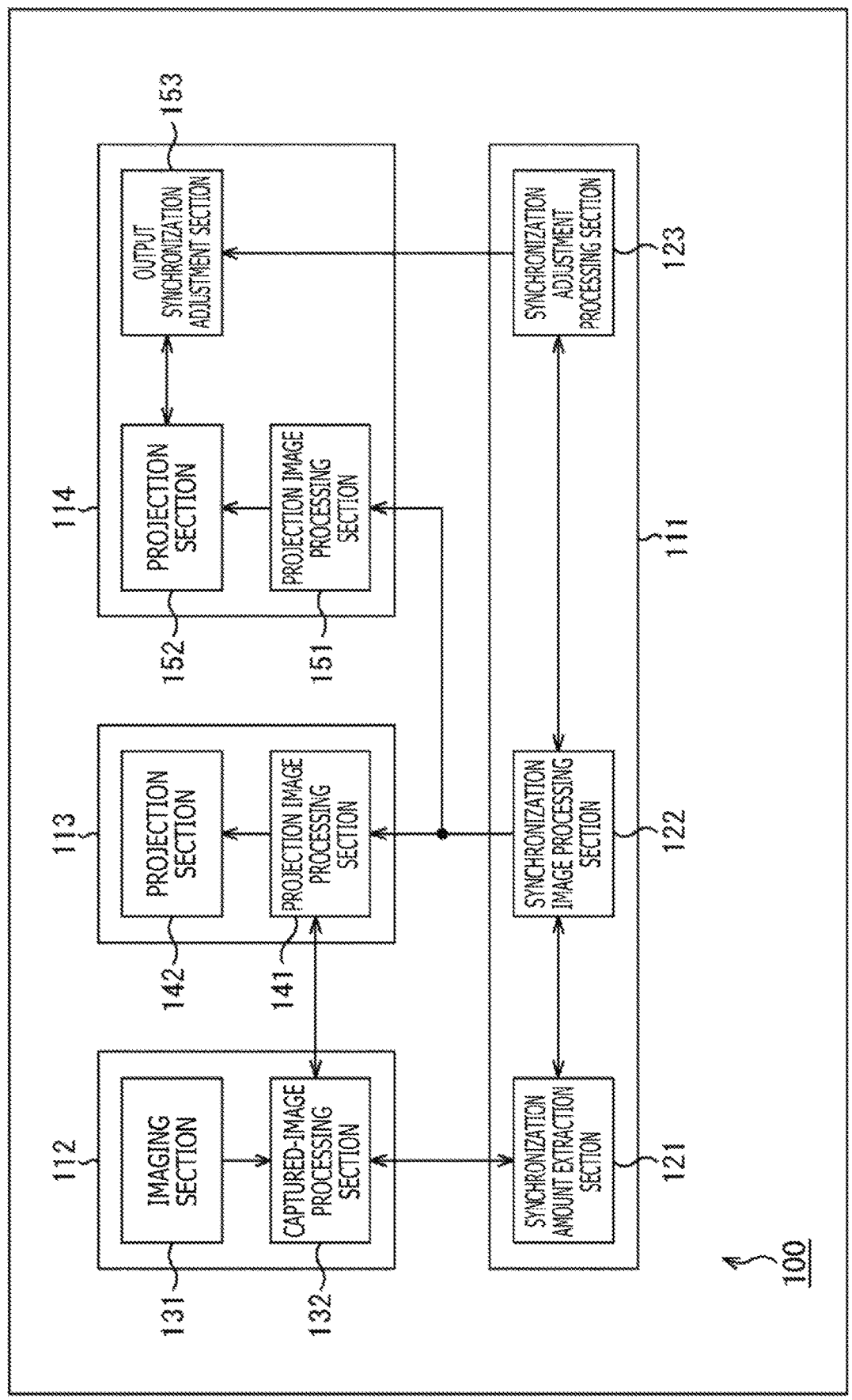
FIG. 3 is a block diagram illustrating a principal exemplary configuration of an image projection system.

FIG. 3 is a block diagram illustrating a principal exemplary configuration of an embodiment of an image projection system to which the present technology is applied. Referring to FIG. 3, the image projection system 100 is capable of projecting images, capturing the projected images, and synchronizing image projections between projection apparatuses by using a method to which the present technology is applied.

As illustrated in FIG. 3, the image projection system 100 includes a control apparatus 111, an imaging apparatus 112, a projection apparatus 113, and a projection apparatus 114. The control apparatus 111 is communicatively connected to each of the imaging apparatus 112, the projection apparatus 113, and the projection apparatus 114. These connections may be established by either wired communication or wireless communication. More specifically, the above apparatuses may be physically connected, for example, with cables and positioned away from each other.

The control apparatus 111 performs a process related to synchronization control over image projections of the projection apparatus 113 and the projection apparatus 114. As illustrated in FIG. 3, the control apparatus 111 includes a synchronization amount extraction section 121, a synchronization image processing section 122, and a synchronization adjustment processing section 123. The synchronization amount extraction section 121, the synchronization image processing section 122, and the synchronization adjustment processing section 123 are capable of transferring information to each other.

The synchronization amount extraction section 121 performs a process related to the extraction of the amount of synchronization between the projection apparatus 113 and the projection apparatus 114. The amount of synchronization is a parameter representing the disruption of image projection timing (referred to also as out-of-synchronization). The amount of synchronization is a parameter indicating, for example, how large the amount of out-of-synchronization is, or how small the amount of out-of-synchronization is. For example, the synchronization amount extraction section 121 extracts the amount of synchronization from a captured image that is obtained when an object is imaged by the imaging apparatus 112. For example, the synchronization amount extraction section 121 calculates the amount of synchronization in accordance with a pixel value of the captured image. For example, the synchronization amount extraction section 121 supplies the calculated amount of synchronization to the synchronization adjustment processing section 123.

The synchronization image processing section 122 performs a process related to image processing for controlling the synchronization with respect to images to be projected. For example, the synchronization image processing section 122 subjects the images to be projected to predetermined image processing for causing the synchronization amount extraction section 121 to extract the amount of synchronization, supplies the resulting processed images to the projection apparatus 113 (its projection image processing section 141) and the projection apparatus 114 (its projection image processing section 151), and allows the projection apparatuses 113 and 114 to project the processed images. The imaging apparatus 112 captures the projected images, and the synchronization amount extraction section 121 detects the amount of synchronization from the captured image. In such an instance, the synchronization amount extraction section 121 detects the amount of synchronization by using the image processing performed on the images to be projected.

The synchronization adjustment processing section 123 performs a process related to the control of synchronization between the projection apparatus 113 and the projection apparatus 114. For example, the synchronization adjustment processing section 123 controls the synchronization between the projection apparatus 113 and the projection apparatus 114 in accordance with the amount of synchronization extracted by the synchronization amount extraction section 121. More specifically, the synchronization adjustment processing section 123 controls the synchronization between a projection section 142 and a projection section 152 in such a manner as to suppress the out-of-synchronization between the projection sections 142 and 152 in accordance with pixel values of captured images that are obtained when the imaging apparatus 112 captures projected images projected to the same position by the projection sections 142 and 152. For example, the synchronization adjustment processing section 123 reduces the out-of-synchronization between the projection apparatus 113 and the projection apparatus 114 by controlling the projection apparatus 114 (its output synchronization adjustment section 153) to adjust the image projection timing of the projection apparatus 114.

The imaging apparatus 112 performs a process related to object imaging. As illustrated in FIG. 3, the imaging apparatus 112 includes an imaging section 131 and a captured-image processing section 132. The imaging section 131 includes, for example, an image sensor that uses a CMOS (Complementary Metal Oxide Semiconductor) or a CCD (Charge-Coupled Device), and performs a process related to object imaging. For example, under control of the captured-image processing section 132, the imaging section 131 captures projected images projected from the projection apparatuses 113 and 114, acquires image data (captured-image data), and supplies the acquired image data to the captured-image processing section 132. The captured-image processing section 132 performs a process related to the captured-image data. For example, the captured-image processing section 132 controls the imaging section 131 so as to let it perform imaging, and acquires captured-image data. Further, the captured-image processing section 132 performs, for example, predetermined signal processing on the captured-image data and supplies the resulting processed image data to the synchronization amount extraction section 121.

The projection apparatus 113 performs a process related to image projection. As illustrated in FIG. 3, the projection apparatus 113 includes a projection image processing section 141 and a projection section 142. The projection image processing section 141 performs a process related to an image to be projected. For example, the projection image processing section 141 acquires image data supplied from the synchronization image processing section 122. Further, for example, the projection image processing section 141 performs predetermined signal processing on the acquired image data and supplies the resulting processed image data to the projection section 142. Furthermore, for example, the projection image processing section 141 controls the projection section 142 so as to let it project an image represented by the processed image data. The projection section 142 performs a process related to image projection. The projection section 142 includes, for example, optical devices such as a lens and a light-emitting device. For example, under control of the projection image processing section 141, the projection section 142 projects an image supplied from the projection image processing section 141.

The projection apparatus 114 performs a process related to image projection. As illustrated in FIG. 3, the projection apparatus 114 includes a projection image processing section 151, a projection section 152, and an output synchronization adjustment section 153. The projection image processing section 151 is a processing section similar to the projection image processing section 141 of the projection apparatus 113, and performs a process related to an image to be projected. For example, the projection image processing section 151 acquires image data supplied from the synchronization image processing section 122. Further, for example, the projection image processing section 151 performs predetermined signal processing on the acquired image data and supplies the resulting processed image data to the projection section 152. Furthermore, for example, the projection image processing section 151 controls the projection section 152 so as to let it project an image represented by the processed image data. The projection section 152 is a processing section similar to the projection section 142 of the projection apparatus 113, and performs a process related to image projection. The projection section 152 includes, for example, optical devices such as a lens and a light-emitting device. For example, under control of the projection image processing section 151, the projection section 152 projects an image supplied from the projection image processing section 151.

The output synchronization adjustment section 153 performs a process related to the adjustment of image projection timing of the projection section 152. For example, the output synchronization adjustment section 153 controls the image projection timing of the projection section 152 in such a manner that image projection occurs at a timing designated by the synchronization adjustment processing section 123. More specifically, the projection apparatus 114 is able to change the image projection timing because it includes the output synchronization adjustment section 153. Meanwhile, the projection apparatus 113 is unable to change the image projection timing (adapted to provide fixed image projection timing).

Flow of Image Projection Processing

Figure 4:
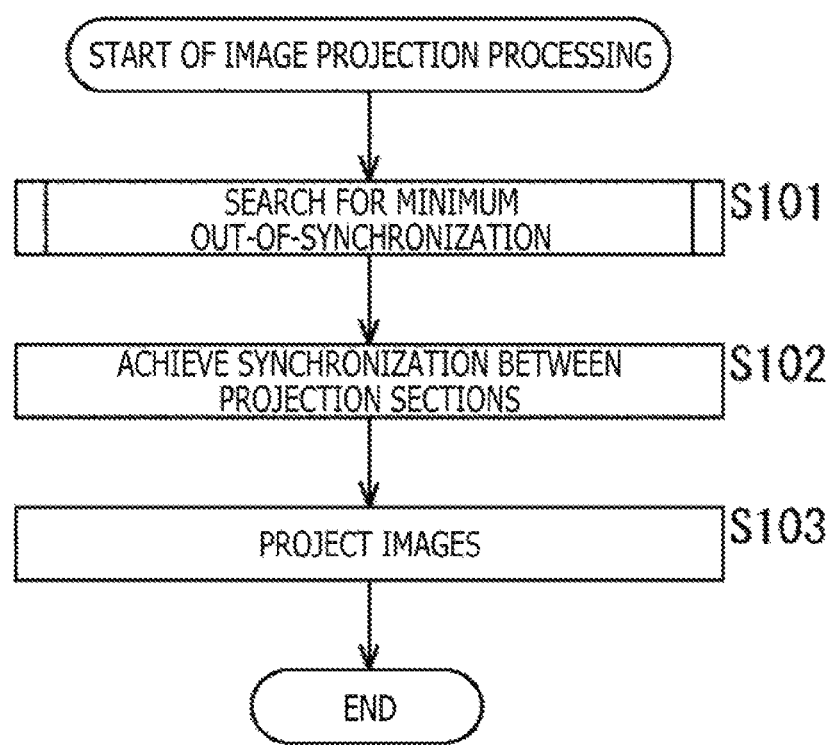
FIG. 4 is a flowchart illustrating an example flow of image projection processing.

An exemplary flow of image projection processing performed by the image projection system 100 having the above-described configuration will now be described with reference to the flowchart of FIG. 4. The image projection system 100 projects an image by performing the image projection processing.

When the image projection processing starts, the control apparatus 111, the imaging apparatus 112, the projection apparatus 113, and the projection apparatus 114 perform minimum out-of-synchronization search processing in step S101 to search for a timing at which the projection apparatus 114 performs image projection in such a manner as to minimize the out-of-synchronization between the projection apparatus 113 and the projection apparatus 114 (this may be referred to also as the synchronization adjustment amount).

When the synchronization adjustment amount, which minimizes the out-of-synchronization, is detected, the control apparatus 111 uses the detected synchronization adjustment amount to control the projection apparatus 114 so as to achieve synchronization between the projection section 142 and the projection section 152. More specifically, the synchronization adjustment processing section 123 controls the output synchronization adjustment section 153 so as to adjust the image projection timing of the projection apparatus 114 (projection section 152) so that image projection (the update of an image to be projected) occurs at the timing determined in step S101. In step S103, the projection section 142 and the projection section 152 each project an image of content at a set timing. When the image projection is completed, for example, by projecting the whole content, the image projection processing terminates.

Case Where Characteristics of Imaging Apparatus are Known

A method of searching for a minimum out-of-synchronization will now be described. In a case where the characteristics of the imaging apparatus 112 are known, the imaging apparatus 112 is driven in synchronism with the image projection timing (image update timing) of the projection section 142 in the projection apparatus 113 so as to make an exposure and acquire a captured image during a period of projection of each frame by the projection section 142, that is, the period between the start and end of projection (until the image is updated to the next frame image).

Figure 5:
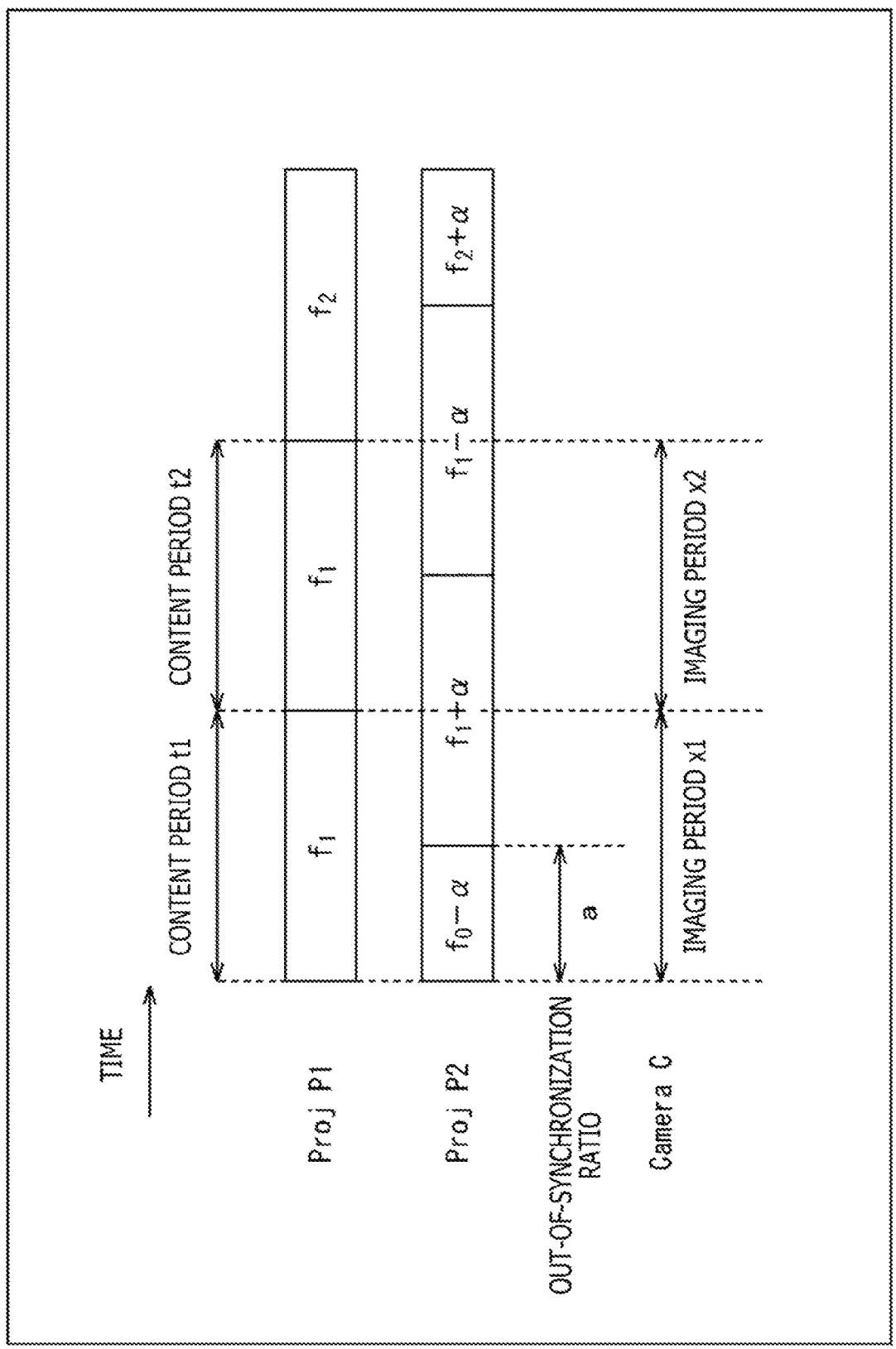
FIG. 5 is a diagram illustrating an example of how to achieve synchronization.

FIG. 5 illustrates an example of how the above operation is performed. As illustrated in FIG. 5, the projection apparatus 113 (Proj P1) projects a frame image $f_1$ of moving image content during a content period t1, projects the frame image $f_1$ again during a content period t2, and projects the next frame image $f_2$ of the moving image content during the next content period. More specifically, the projection apparatus 113 projects each frame image of the moving image content two times. It should be noted that the content periods represent intervals at which the image to be projected by the projection apparatus 113 is updated (denote the duration of one frame at a frame rate for image projection). In this case, therefore, the projection apparatus 113 is able to perform a projection image update in such a manner that the projection image is updated at two times the frame rate of the moving image to be projected.

Further, the amount of out-of-synchronization between the projection apparatus 113 and the projection apparatus 114 is assumed to be such that an out-of-synchronization ratio of a represents a case where the out-of-synchronization amount of one content period is 1. During the first a period of the content period t1, the projection apparatus 114 (Proj P2) projects an image $(f_0-\alpha)$ that is obtained by embedding a signal having an amplitude indicated by the negative value "$-\alpha$" (referred to also as an embedded value) in a frame image $f_0$ immediately preceding the frame image $f_1$ of the moving image content. Subsequently, during one content period, the projection apparatus 114 projects an image $(f_1+\alpha)$ that is obtained by embedding a signal having an amplitude indicated by the positive value "$+\alpha$" in the frame image $f_1$. More specifically, during the remaining period within the content period t1 and during the first a period of the content period t2, the projection apparatus 114 projects the image $(f_1+\alpha)$ that is obtained by embedding the positive value "$+\alpha$" in the frame image $f_1$. Subsequently, during one content period, the projection apparatus 114 projects an image $(f_1-\alpha)$ that is obtained by embedding the negative value "$-\alpha$" in the frame image $f_1$. More specifically, during the remaining period within the content period t2 and during the first a period within the next content period, the projection apparatus 114 projects the image $(f_1-\alpha)$ that is obtained by embedding the negative value "$-\alpha$" in the frame image $f_1$. Moreover, during the remaining period within a period next to the content period t2, the projection apparatus 114 projects an image $(f_2+\alpha)$ that is obtained by embedding the positive value "$+\alpha$" in the frame image $f_2$.

More specifically, the projection apparatus 114 generates an image that is obtained by embedding the positive value "$+\alpha$" in each frame image of the same moving image content as that is projected by the projection apparatus 113, additionally generates an image that is obtained by embedding the negative value "$-\alpha$" in each frame image of the same moving image content as that is projected by the projection apparatus 113, and successively projects the generated images. More specifically, the projection apparatus 114 is also able to perform a projection image update in such a manner that the projection image is updated at two times the frame rate of the moving image to be projected.

The values to be embedded may be any value that changes the pixel values. For example, the values to be embedded may be a value that changes the brightness and color of a frame image. Further, the values to be embedded may be a value that uniformly changes the whole frame image or applies changes the degree of which varies with pixel and region. For example, a predetermined pattern image may be embedded. Further, the value to be embedded may be embedded in the whole frame image or in a part of the frame image. For example, the value to be embedded may be embedded in an unnoticeable region such as the vicinity of an outer frame of the frame image.

The projection apparatus 113 and the projection apparatus 114 project images to the same position. Therefore, the images projected by them superimpose upon each other. The imaging apparatus 112 (Camera C) synchronizes with the projection apparatus 113 and captures the superimposed projected image (a projected image obtained when the projection image projected by the projection apparatus 113 and the projection image projected by the projection apparatus 114 are superimposed upon each other) once for each content period of the projection apparatus 113. In such an instance, the imaging apparatus 112 generates a captured image by making an exposure between the start and end of a content period. More specifically, an imaging period x1 of the imaging apparatus 112 corresponds to the content period t1 of the projection apparatus 113, and an imaging period x2 of the imaging apparatus 112 corresponds to the content period t2 of the projection apparatus 113. This signifies that the imaging periods of the imaging apparatus 112 coincide with the content periods of the projection apparatus 113.

The out-of-synchronization amount is extracted as described below from the captured image acquired in the above manner. First of all, a pixel value w1 of the captured image of the content period t1 can be expressed by Equation (1) below. Further, a pixel value w2 of the captured image of the content period t2 can be expressed by Equation (2) below. Furthermore, the difference z between the pixel values can be expressed by Equation (3) below.

$$w1 = f_1 + a(f_0 - \alpha) + (1-a)(f_1 + \alpha) \quad (1)$$

$$w2 = f_1 + a(f_0 + \alpha) + (1-a)(f_1 - \alpha) \quad (2)$$

$$z = a(f_0 - f_1) + 2\alpha(1 - 2a) \quad (3)$$

In a case where the frame images $f_0$, $f_1$, and $f_2$ are identical with each other (i.e., the content is a still image), it is possible to acquire a value for embedding that depends on the out-of-synchronization ratio a. More specifically, if $f_0 = f_1$ in Equation (3), the difference z is expressed by Equation (4) below.

$$z = 2\alpha(1 - 2a) \quad (4)$$

If, in the above instance, there is no out-of-synchronization (a=0), the difference z is expressed by Equation (5) below.

$$Z = 2\alpha \quad (5)$$

More specifically, in a difference image representing the difference between the captured image of the imaging period x1 and the captured image of the imaging period x2 (the projected image of the content period t1 and the projected image of the content period t2), it can be said that the higher the precision with which an embedded value is detected, the smaller the amount of out-of-synchronization between the projection apparatus 113 and the projection apparatus 114. Incidentally, as $0 \leq a \leq 1$, the maximum value of the difference z indicated by Equation (4) is $2\alpha$. More specifically, the amount of out-of-synchronization (out-of-synchronization ratio a) can be minimized by adjusting the image projection timing of the projection apparatus 114 in such a manner as to maximize the difference z.

Flow of Minimum Out-of-Synchronization Search Processing>

An exemplary flow of minimum out-of-synchronization search processing performed in step S101 of FIG. 4 in the above-described case will now be described with reference to the flowchart of FIG. 6.

When the minimum out-of-synchronization search processing starts, the synchronization adjustment processing section 123 sets a synchronization adjustment amount in step S151. More specifically, the synchronization adjustment processing section 123 controls the output synchronization adjustment section 153 of the projection apparatus 114 so as to set the image projection timing (projection image update timing) of the projection section 152.

In step S152, the synchronization image processing section 122 embeds a synchronization detection signal (a positive value "α") in a projection image. In step S153, the synchronization image processing section 122 supplies a pre-embedding image to the projection apparatus 113, supplies a post-embedding image to the projection apparatus 114, and causes the projection apparatuses 113 and 114 to respectively project the supplied image at their own timing. The projection image processing section 141 of the projection apparatus 113 supplies the supplied image to the projection section 142 and causes the projection section 142 to project the supplied image. The projection section 142 projects the supplied image at its own timing during one content period. The projection image processing section 151 of the projection apparatus 114 supplies the supplied image to the projection section 152 and causes the projection section 152 to project the supplied image. The projection section 152 projects the supplied image during one content period at a timing set by the output synchronization adjustment section 153 (i.e., the synchronization adjustment processing section 123).

In step S154, the captured-image processing section 132 of the imaging apparatus 112 controls the imaging section 131 so as to let it capture a projection image projected by the projection apparatuses 113 and 114 (a projected image obtained when the projection image projected by the projection apparatus 113 and the projection image projected by the projection apparatus 114 are superimposed upon each other). When the captured-image processing section 132 exercises control so as to acquire the captured image by letting the imaging section 131 perform imaging in synchronism with the image projection timing of the projection apparatus 113, the captured-image processing section 132 supplies the acquired captured image to the synchronization amount extraction section 121.

In step S155, the synchronization image processing section 122 embeds a synchronization detection signal (a negative value "−α") in a projection image. In step S156, the synchronization image processing section 122 supplies a pre-embedding image to the projection apparatus 113, supplies a post-embedding image to the projection apparatus 114, and causes the projection apparatuses 113 and 114 to respectively project the supplied image at their own timing. The projection image processing section 141 of the projection apparatus 113 supplies the supplied image to the projection section 142 and causes the projection section 142 to project the supplied image. The projection section 142 projects the supplied image at its own timing during one content period. The projection image processing section 151 of the projection apparatus 114 supplies the supplied image to the projection section 152 and causes the projection section 152 to project the supplied image. The projection section 152 projects the supplied image during one content period at a timing set by the output synchronization adjustment section 153 (i.e., the synchronization adjustment processing section 123). In step S157, the captured-image processing section 132 of the imaging apparatus 112 controls the imaging section 131 so as to let it capture a projection image projected by the projection apparatuses 113 and 114 (a projected image obtained when the projection image projected by the projection apparatus 113 and the projection image projected by the projection apparatus 114 are superimposed upon each other). When the captured-image processing section 132 exercises control so as to acquire the captured image by letting the imaging section 131 perform imaging in synchronism with the image projection timing of the projection apparatus 113, the captured-image processing section 132 supplies the acquired captured image to the synchronization amount extraction section 121.

In step S158, the synchronization amount extraction section 121 extracts the amount of synchronization from the captured image acquired in step S154 and the captured image acquired in step S157. For example, the synchronization amount extraction section 121 calculates the difference value between the captured images as the synchronization amount.

In step S159, on the basis of the currently acquired difference value and a previously acquired difference value, the synchronization amount extraction section 121 searches for a synchronization adjustment amount that minimizes the out-of-synchronization, and determines whether the synchronization adjustment amount minimizing the out-of-synchronization is detected. In this case, as mentioned earlier, the out-of-synchronization is minimized when the difference value is maximized. Therefore, the synchronization amount extraction section 121 searches for the maximum difference value.

In a case where the maximum difference value is still not detected and it is determined that the synchronization adjustment amount minimizing the out-of-synchronization is not detected, processing returns to step S151, and then the subsequent steps are repeated. In such a case, in step S151, the synchronization adjustment processing section 123 controls the output synchronization adjustment section 153 to set a new timing as the image projection timing of the projection section 152 (i.e., updates the synchronization adjustment amount).

More specifically, the synchronization amount extraction section 121 determines the difference between a plurality of successively captured images as the parameter representing the disruption of image projection timing between the projection apparatus 113 and the projection apparatus 114, and the synchronization adjustment processing section 123 controls the image projection timing of the projection apparatus 114, that is, the synchronization between the projection apparatus 113 and the projection apparatus 114, in such a manner as to maximize the difference calculated by the synchronization amount extraction section 121.

In the manner described above, steps S151 to S159 are repeatedly performed until the synchronization adjustment amount minimizing the out-of-synchronization is detected (until the maximum difference value is detected). Then, in a case where it is determined in step S159 that the synchronization adjustment amount minimizing the out-of-synchronization is detected, the minimum out-of-synchronization search processing terminates, and the synchronization adjustment processing section 123 is informed that the synchronization adjustment amount minimizing the out-of-synchronization is detected. Alternatively, the detected synchronization adjustment amount may be supplied to the synchronization adjustment processing section 123.

The synchronization adjustment processing section 123 uses the detected synchronization adjustment amount to control the output synchronization adjustment section 153 so as to let it control the image projection timing of the projection apparatus 114 (projection section 152). As a result, the image projection timing of the projection apparatus 114 is set so as to minimize the out-of-synchronization (step S102).

More specifically, the synchronization adjustment processing section 123 controls the synchronization between the projection apparatus 113 and the projection apparatus 114 in such a manner that the absolute values of embedded values contained in the projected images onto which a positive value and a negative value are alternately projected by the projection apparatus 114 are maximized in the captured images captured by the imaging apparatus 112 in synchronism with the projection apparatus 113.

Controlling the image projection timing in the above-described manner makes it possible to synchronize a plurality of image projections with increased accuracy that is equivalent to intervals shorter than the imaging intervals. More specifically, a plurality of images can be synchronized more accurately. Further, the above-described method merely embeds values in the images, projects the images, and searches for a timing that maximizes the difference value between the captured images derived from the projected images. Therefore, synchronization can be achieved with ease. Furthermore, when the above-described method is used, it is required that the imaging apparatus 112 be able to merely capture images at substantially the same frame rate as that for moving image content. Moreover, only one unit of the imaging apparatus 112 is required. Consequently, synchronization can be achieved while suppressing an increase in the cost.

It should be noted that the content used to detect the above-described out-of-synchronization need not always be a still image. More specifically, the frame images $f_0$, $f_1$, and $f_2$ need not always be identical with each other. As the frame images $f_0$, $f_1$, and $f_2$ are derived from successive frames, the difference between such frame images is generally insignificant. Thus, the synchronization adjustment amount minimizing the out-of-synchronization can be detected. Therefore, synchronization can also be achieved, for example, by embedding values in frame images obtained during the projection of moving image content. Therefore, this eliminates the necessity of interrupting a content projection for out-of-synchronization adjustment purposes, and makes it easy to cope with out-of-synchronization caused, for example, by operating environment changes and temporal changes in a projection apparatus. Further, in such a case, when positive and negative values are embedded in the same frame as mentioned earlier, the positive and negative embedded values in projected images offset each other. This makes it possible to suppress the degradation of the subjective image quality of the projected images.

Obviously, a still image may be projected when synchronization control is to be exercised in the above-described manner. For example, while moving image content is not being projected (e.g., before or after image projection), synchronization control may be exercised by using a still image.

Figure 6:
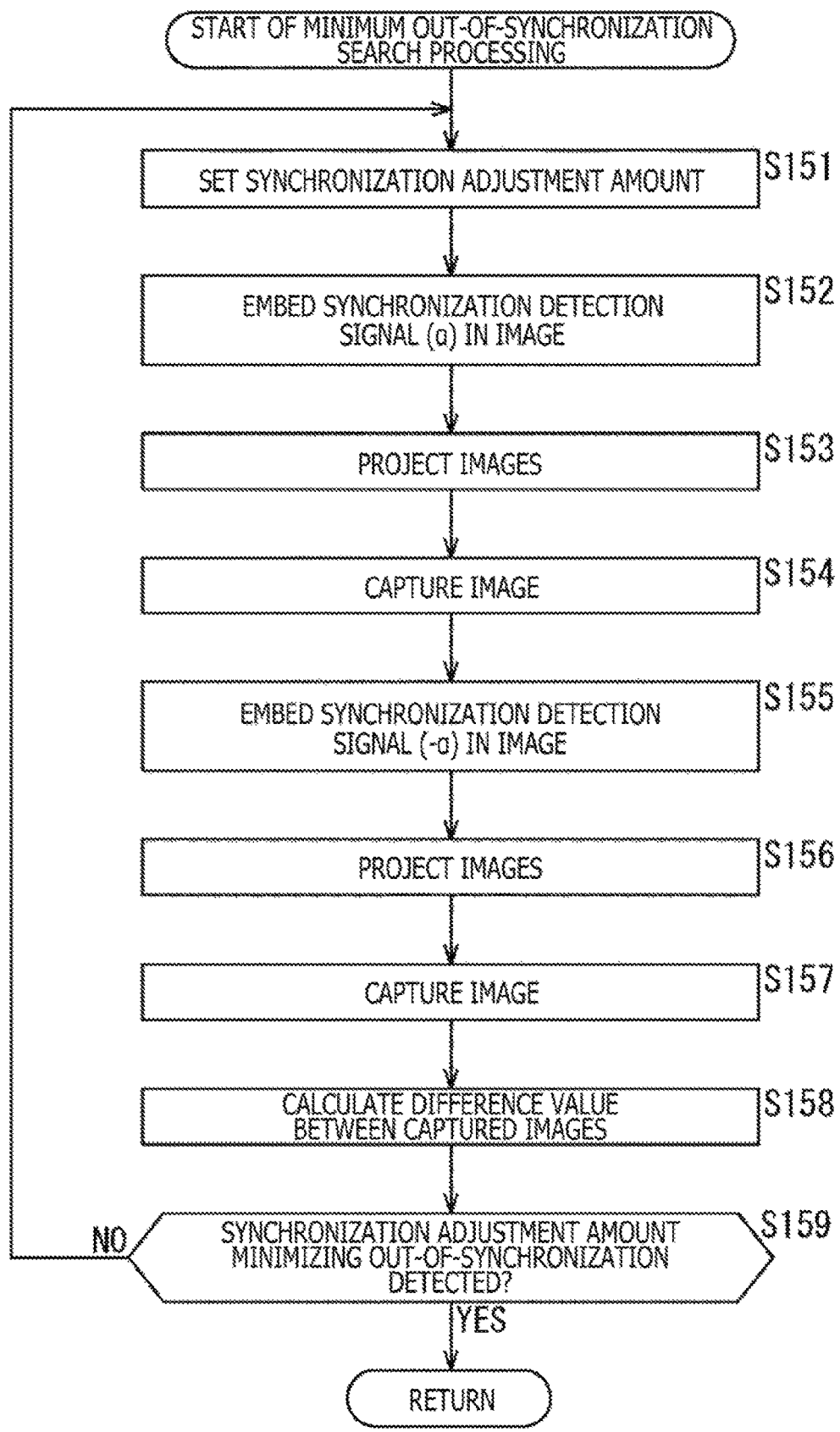
FIG. 6 is a flowchart illustrating an example flow of minimum out-of-synchronization amount calculation processing.

It should be noted that an alternative method may be used in step S157 of FIG. 6 to search for the synchronization adjustment amount minimizing the out-of-synchronization and determine whether the synchronization adjustment amount is searched. For example, an alternative is to obtain the difference value between an image captured during one content period and an image captured during the immediately preceding period, wait until a time point at which the difference value is smaller than the preceding one, then regard the difference value obtained from the immediately preceding content period as the maximum value, and detect the synchronization adjustment amount for that content period as the synchronization adjustment amount minimizing the out-of-synchronization. Another alternative is, for example, to obtain difference values between images captured during a predetermined number of content periods, determine a synchronization adjustment amount for a content period that yields the maximum difference value, and detect that synchronization adjustment amount as the synchronization adjustment amount minimizing the out-of-synchronization. Still another alternative is, for example, to obtain a more accurate synchronization adjustment amount by repeating, a number of times, the search for a synchronization adjustment amount that minimizes the out-of-synchronization.

Further, the difference values between the captured images may be obtained from the whole or part of a projected image. For example, the sum of the difference values between the captured images concerning all pixels of the projected image may be regarded as the "difference value between captured images" and used to search a synchronization adjustment amount that minimizes the out-of-synchronization. Alternatively, all the pixels of the projected image may be checked on an individual pixel basis to search synchronization adjustment amounts minimizing the out-of-synchronization and determine the final synchronization adjustment amount by using the searched synchronization adjustment amounts.

Furthermore, a certain region of the projected image may be checked to obtain the "difference value between captured images" on an individual pixel basis or on a whole region basis and use the obtained value to search the synchronization adjustment amount minimizing the out-of-synchronization. Moreover, some of the pixels in the projected image may be regarded as representative pixels, and checked to obtain the "difference value between captured images" on an individual pixel basis or on the whole representative pixel basis in order to search the synchronization adjustment amount minimizing the out-of-synchronization by using the obtained value.

3. Second Embodiment

Case Where Characteristics of Imaging Apparatus are Unknown

In a case where the characteristics of the imaging apparatus 112 are unknown, it is difficult to drive the imaging apparatus 112 in synchronism with the image projection timing (image update timing) of the projection section 142 of the projection apparatus 113. In this case, therefore, as regards captured images captured by the imaging apparatus 112, the synchronization between the projection apparatus 113 and the projection apparatus 114 is controlled so as to minimize the difference between projected images and the result of combination of different pattern images projected from the projection apparatus 113 and the projection apparatus 114.

Figure 7:
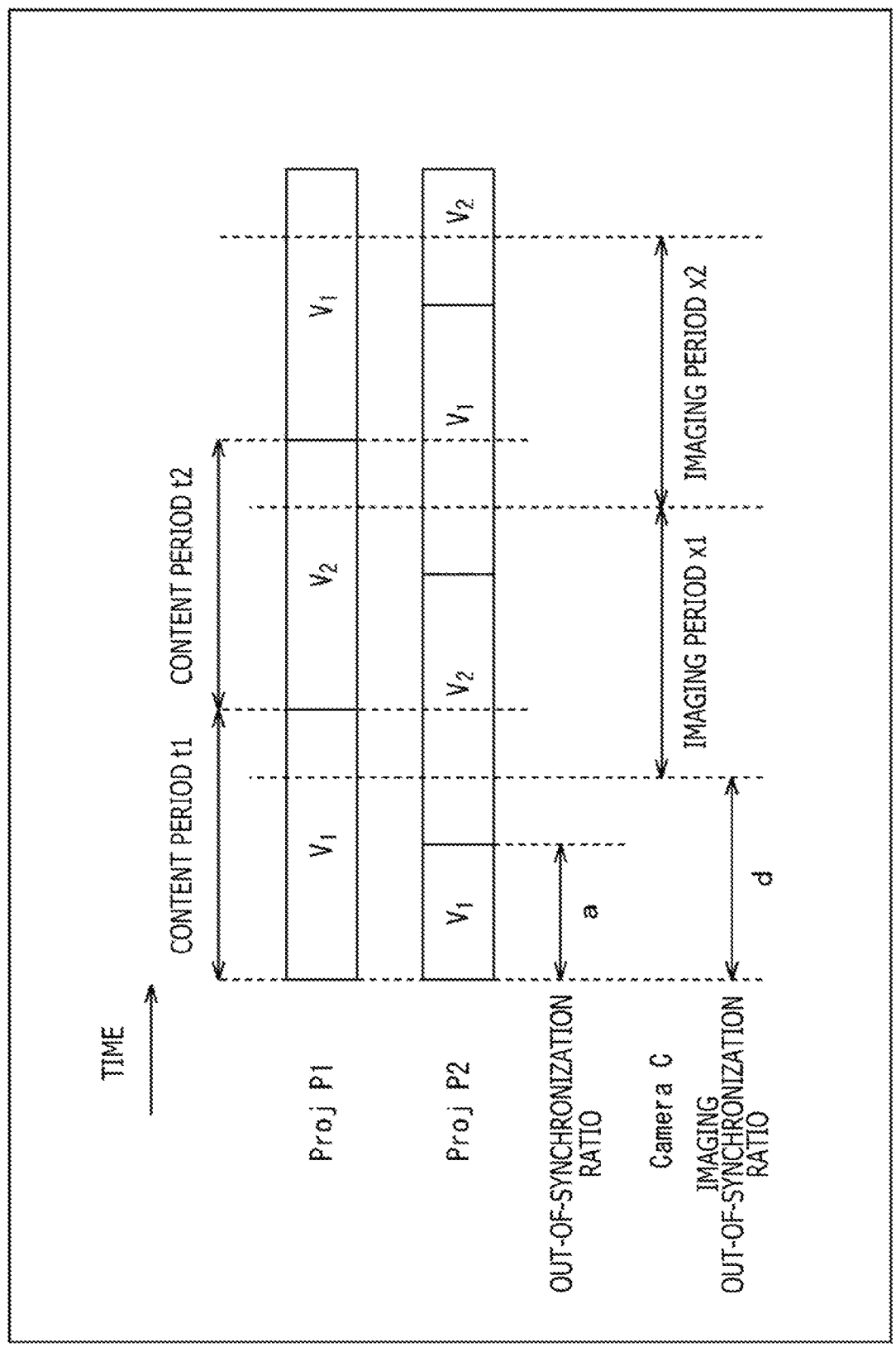
FIG. 7 is a diagram illustrating an example of how to achieve synchronization.

FIG. 7 illustrates an example of how the above synchronization is controlled. As illustrated in FIG. 7, the projection apparatus 113 (Proj P1) projects a predetermined pattern image V1 during the content period t1, and projects a predetermined pattern image V2 different from the pattern image V1 during the content period t2. Further, the projection apparatus 113 projects the pattern image V1 during the next content period. More specifically, the projection apparatus 113 alternately projects the pattern image V1 and the pattern image V2. Stated differently, the projection apparatus 113 sequentially projects a plurality of pattern images.

Meanwhile, the projection apparatus 114 (Proj P2) projects the pattern image V1 during the first a period within the content period t1, and then projects the pattern image V2 during one content period. Subsequently, the projection apparatus 114 projects the pattern image V1 during one content period, and then projects the pattern image V2 during one content period. More specifically, the projection apparatus 114 alternately projects the pattern image V1 and the pattern image V2, as is the case with the projection apparatus 113. Stated differently, the projection apparatus 114 sequentially projects a plurality of pattern images. However, the projection apparatus 114 projects a pattern image that is different from the pattern image projected by the projection apparatus 113. More specifically, the projection apparatus 114 projects the pattern image V2 during a content period during which the projection apparatus 113 projects the pattern image V1, and projects the pattern image V1 during a content period during which the projection apparatus 113 projects the pattern image V2. However, the image projection timing of the projection apparatus 114 deviates (retards) from the image projection timing of the projection apparatus 113 by the out-of-synchronization ratio a.

As the projection apparatus 113 and the projection apparatus 114 project images to the same position, the projected images superimpose upon each other. The imaging apparatus 112 (camera C) captures, at an independent timing, an image of the superimposed projected image (a projected image obtained when the projection image projected by the projection apparatus 113 and the projection image projected by the projection apparatus 114 are superimposed upon each other). More specifically, the timing of periods of imaging by the imaging apparatus 112 (e.g., the imaging period x1 and the imaging period x2) is not in synchronism with the content periods of the projection apparatus 113 and projection apparatus 114. For example, the amount of out-of-synchronization between the imaging apparatus 112 and the projection apparatus 113 is defined as the imaging out-of-synchronization ratio d in a case where the amount of out-of-synchronization during one content period is 1. However, also in this case, the imaging periods are equal in length to the content periods. More specifically, the imaging apparatus 112 generates the captured images by making an exposure for the same duration as the content periods.

In a case where there is no out-of-synchronization (a=0), the sum of a projection image projected by the projection apparatus 113 and a projection image projected by the projection apparatus 114 is equal to V1+V2 during each content period. It signifies that a projected image in a captured image captured during an imaging period having the same duration as the associated content period is also equal to V1+V2. More specifically, the out-of-synchronization (out-of-synchronization ratio a) can be minimized by using the value (V1+V2) as a target value of a captured image and adjusting the image projection timing of the projection apparatus 114 in such a manner that the value of the captured image becomes closer to the target value (V1+V2).

Flow of Minimum Out-of-Synchronization Search Processing

An exemplary flow of minimum out-of-synchronization search processing performed in step S101 of FIG. 4 in the above-described case will now be described with reference to the flowchart of FIG. 8.

When the minimum out-of-synchronization search processing starts, first of all, the target value (V1+V2) of the captured image is determined. In step S251, the synchronization image processing section 122 supplies the pattern image V1 to the projection apparatus 113 and causes the projection apparatus 113 to project the supplied pattern image V1. The projection image processing section 141 of the projection apparatus 113 supplies the pattern image V1 to the projection section 142 and causes the projection section 142 to project the pattern image V1. It should be noted that this image projection continues at least until imaging is performed.

In step S252, the captured-image processing section 132 of the imaging apparatus 112 controls the imaging section 131 so as to let it capture an image of the projected image by making an exposure during one imaging period. Upon acquiring the captured image captured by the imaging section 131, the captured-image processing section 132 supplies the acquired captured image to the synchronization amount extraction section 121.

In step S253, the synchronization image processing section 122 supplies the pattern image V2 to the projection apparatus 113 and causes the projection apparatus 113 to project the pattern image V2. The projection image processing section 141 of the projection apparatus 113 supplies the pattern image V2 to the projection section 142 and causes the projection section 142 to project the pattern image V2. It should be noted that this image projection continues at least until imaging is performed.

In step S254, the captured-image processing section 132 of the imaging apparatus 112 controls the imaging section 131 so as to let it capture an image of the projected image at its own timing by making an exposure during one imaging period. Upon acquiring the captured image captured by the imaging section 131, the captured-image processing section 132 supplies the acquired captured image to the synchronization amount extraction section 121.

In step S255, the synchronization amount extraction section 121 calculates the target value (V1+V2) by adding the captured image acquired in step S252 to the captured image acquired in step S254.

After the target value (V1+V2) is calculated, the synchronization adjustment processing section 123 sets the synchronization adjustment amount in step S256. More specifically, the synchronization adjustment processing section 123 controls the output synchronization adjustment section 153 of the projection apparatus 114 so as to set the image projection timing (projection image update timing) of the projection section 152.

In step S257, the synchronization image processing section 122 alternately supplies the pattern image V1 and the pattern image V2 to the projection apparatus 113 during one content period after another, and causes the projection apparatus 113 to alternately project the pattern image V1 and the pattern image V2 during one content period after another. The projection image processing section 141 of the projection apparatus 113 supplies the supplied pattern images to the projection section 142 and causes the projection section 142 to project the supplied pattern images. The projection section 142 projects the supplied pattern images at its own timing during one content period. More specifically, the projection section 142 alternately projects the pattern image V1 and the pattern image V2 during one content period after another.

Similarly, the synchronization image processing section 122 alternately supplies the pattern image V2 and the pattern image V1 to the projection apparatus 113 during one content period after another, and causes the projection apparatus 113 to alternately project the pattern images during one content period after another. The projection image processing section 151 of the projection apparatus 114 supplies the supplied pattern images to the projection section 152 and causes the projection section 152 to project the supplied pattern images. The projection section 152 projects the supplied pattern images during one content period at a timing set by the output synchronization adjustment section 153 (i.e., the synchronization adjustment processing section 123). More specifically, the projection section 152 alternately projects the pattern image V2 and the pattern image V1 during one content period after another.

It should be noted that the synchronization image processing section 122 supplies, during each content period, one of the pattern images V1 and V2 to the projection apparatus 113 and the other to the projection apparatus 114. More specifically, the projection apparatus 113 and the projection apparatus 114 project different pattern images during each content period. More specifically, in a case where, for example, the projection apparatus 113 projects the pattern image V1 during a certain content period of the projection apparatus 113, the projection apparatus 114 projects the pattern image V2 during a content period of the projection apparatus 114 that corresponds to the above-mentioned certain content period. Conversely, in a case where the projection apparatus 113 projects the pattern image V2 during a certain content period of the projection apparatus 113, the projection apparatus 114 projects the pattern image V1 during a content period of the projection apparatus 114 that corresponds to the above-mentioned certain content period. It should be noted that the term "correspond" is used here to indicate content periods coinciding in time with each other in a case where there is no out-of-synchronization (a=0).

In step S258, the captured-image processing section 132 of the imaging apparatus 112 controls the imaging section 131 so as to let it capture an image of the projected image at its own timing by making an exposure during one imaging period. Upon acquiring the captured image captured by the imaging section 131, the captured-image processing section 132 supplies the acquired captured image to the synchronization amount extraction section 121.

In step S259, the synchronization amount extraction section 121 calculates the difference value between the captured image acquired through the processing in step S258 and the target value (V1+V2) acquired through the processing in step S255 as the synchronization amount.

In step S260, on the basis of the currently acquired difference value and the previously acquired difference value, the synchronization amount extraction section 121 searches for a synchronization adjustment amount minimizing the out-of-synchronization, and determines whether the synchronization adjustment amount minimizing the out-of-synchronization is detected. In this case, as mentioned earlier, the out-of-synchronization is minimized when a minimum difference value is obtained. Therefore, the synchronization amount extraction section 121 searches for the minimum difference value.

In a case where the minimum difference value is still not detected and it is determined that the synchronization adjustment amount minimizing the out-of-synchronization is not detected, processing returns to step S256, and then the subsequent steps are repeated. In such a case, in step S256, the synchronization adjustment processing section 123 controls the output synchronization adjustment section 153 to set a new timing as the image projection timing of the projection section 152 (i.e., updates the synchronization adjustment amount).

More specifically, the synchronization amount extraction section 121 determines the difference between the captured image and the target value (the result of combination of the pattern images V1 and V2) as the parameter representing the disruption of image projection timing between the projection apparatus 113 and the projection apparatus 114, and the synchronization adjustment processing section 123 controls the image projection timing of the projection apparatus 114, that is, the synchronization between the projection apparatus 113 and the projection apparatus 114, in such a manner as to minimize the difference calculated by the synchronization amount extraction section 121.

In the manner described above, steps S256 to S260 are repeatedly performed until the synchronization adjustment amount minimizing the out-of-synchronization is detected (until the maximum difference value is detected). Then, in a case where it is determined in step S260 that the synchronization adjustment amount minimizing the out-of-synchronization is detected, the minimum out-of-synchronization search processing terminates, and the synchronization adjustment processing section 123 is informed that the synchronization adjustment amount minimizing the out-of-synchronization is detected. Alternatively, the detected synchronization adjustment amount may be supplied to the synchronization adjustment processing section 123.

The synchronization adjustment processing section 123 uses the detected synchronization adjustment amount to control the output synchronization adjustment section 153 so as to let it control the image projection timing of the projection apparatus 114 (projection section 152). As a result, the image projection timing of the projection apparatus 114 is set so as to minimize the out-of-synchronization (step S102).

More specifically, the synchronization adjustment processing section 123 controls the synchronization between the projection apparatus 113 and the projection apparatus 114 so as to minimize the difference between a projected image obtained when different pattern images are projected to the same position by the projection apparatus 113 and the projection apparatus 114 and the result of combination of the projected pattern images.

Controlling the image projection timing in the above-described manner makes it possible to synchronize a plurality of image projections with increased accuracy that is equivalent to intervals shorter than the imaging intervals even in a case where the characteristics of the imaging apparatus are unknown. More specifically, a plurality of images can be synchronized more accurately. Further, the above-described method merely projects a plurality of pattern images, and searches for a timing that minimizes the difference value between the captured images derived from the projected pattern images and the target value. Therefore, synchronization can be achieved with ease. Furthermore, when the above-described method is used, it is only required that the imaging apparatus 112 be able to capture images at substantially the same frame rate as that for moving image content. Moreover, only one unit of the imaging apparatus 112 is required. Consequently, synchronization can be achieved while suppressing an increase in the cost.

The above-mentioned pattern image V1 and pattern image V2 may be any images that differ from each other. Further, any number of pattern images may be used as far as two or more pattern images are used. For example, three or more different pattern images may be used.

Figure 8:
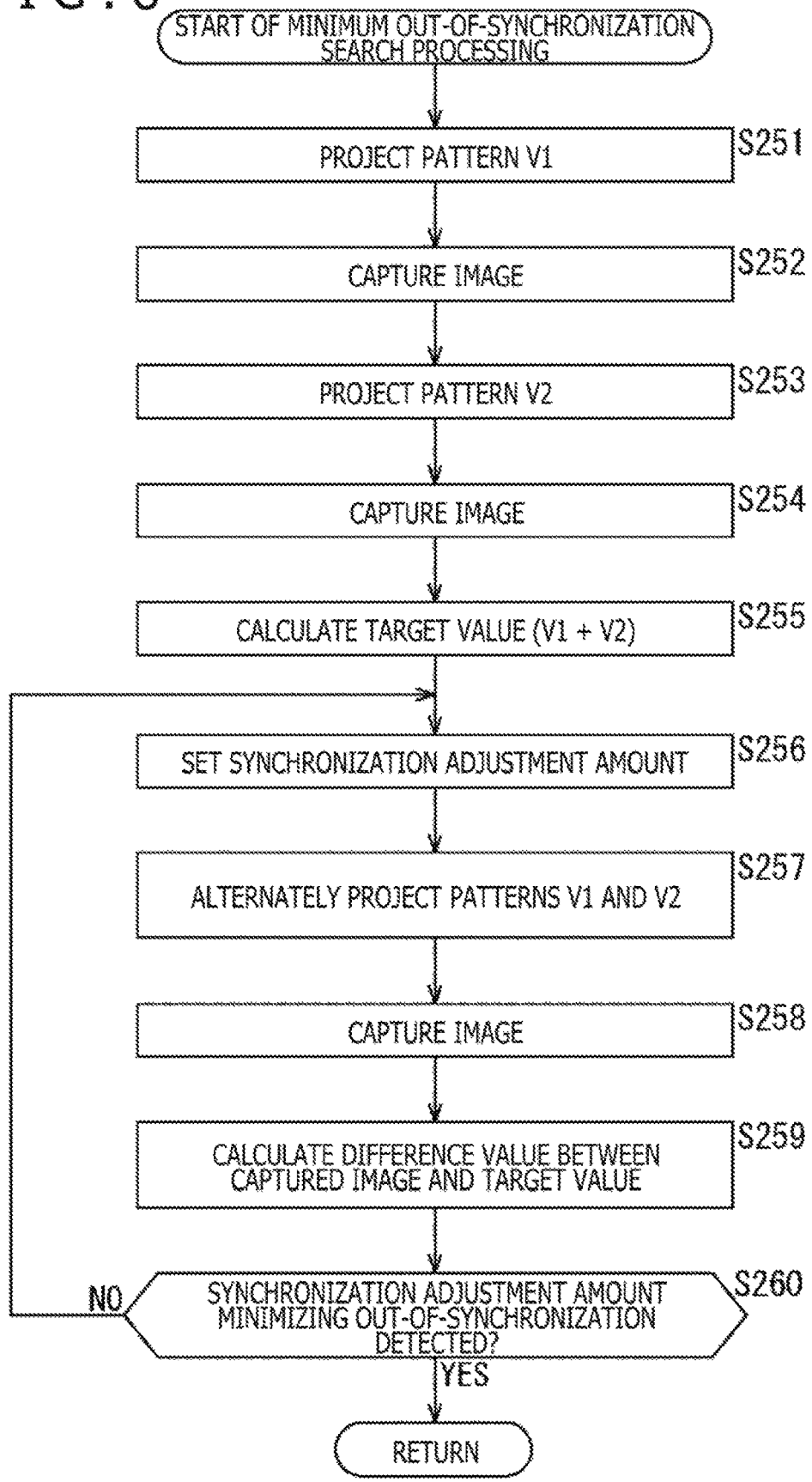
FIG. 8 is a flowchart illustrating an example flow of minimum out-of-synchronization amount calculation processing.

It should be noted that any method may be used in step S260 of FIG. 8 in order to search for a synchronization adjustment amount minimizing the out-of-synchronization and determine whether the synchronization adjustment amount is searched out. For example, an alternative is to determine the difference value between the captured images and the target value each time, wait until a time point at which the difference value is greater than the preceding one, then regard the difference value between an immediately preceding captured image and the target value as the minimum value, and detect the resulting synchronization adjustment amount as the synchronization adjustment amount minimizing the out-of-synchronization. Another alternative is, for example, to perform imaging a predetermined number of times, determine the difference value between each captured image and the target value, and detect a synchronization adjustment amount derived from an imaging operation performed to acquire a captured image providing the minimum difference value as the synchronization adjustment amount minimizing the out-of-synchronization. Still another alternative is, for example, to obtain a more accurate synchronization adjustment amount by repeating, a number of times, the search for a synchronization adjustment amount that minimizes the out-of-synchronization.

4. Third Embodiment

Alternative Configurations

The configuration of the image projection system 100 according to the present technology is not limited to the above-described example in FIG. 3. For example, any number of pieces of the control apparatus 111, imaging apparatus 112, projection apparatus 113, and projection apparatus 114 may be used. For example, a plurality of pieces of the control apparatus 111 and a plurality of pieces of the imaging apparatus 112 may be used, and three or more projection apparatuses may be used. Further, the specifications (e.g., resolution, brightness, and frame rate) for the projection apparatuses may be identical with or different from each other. Furthermore, the projection apparatus in the image projection system 100 may be limited to the projection apparatus 114 (a plurality of pieces of the projection apparatus 114). More specifically, all the projection apparatuses in the image projection system 100 may have a function of adjust the image projection timing (so that the image projection timing is variable).

Figure 9:
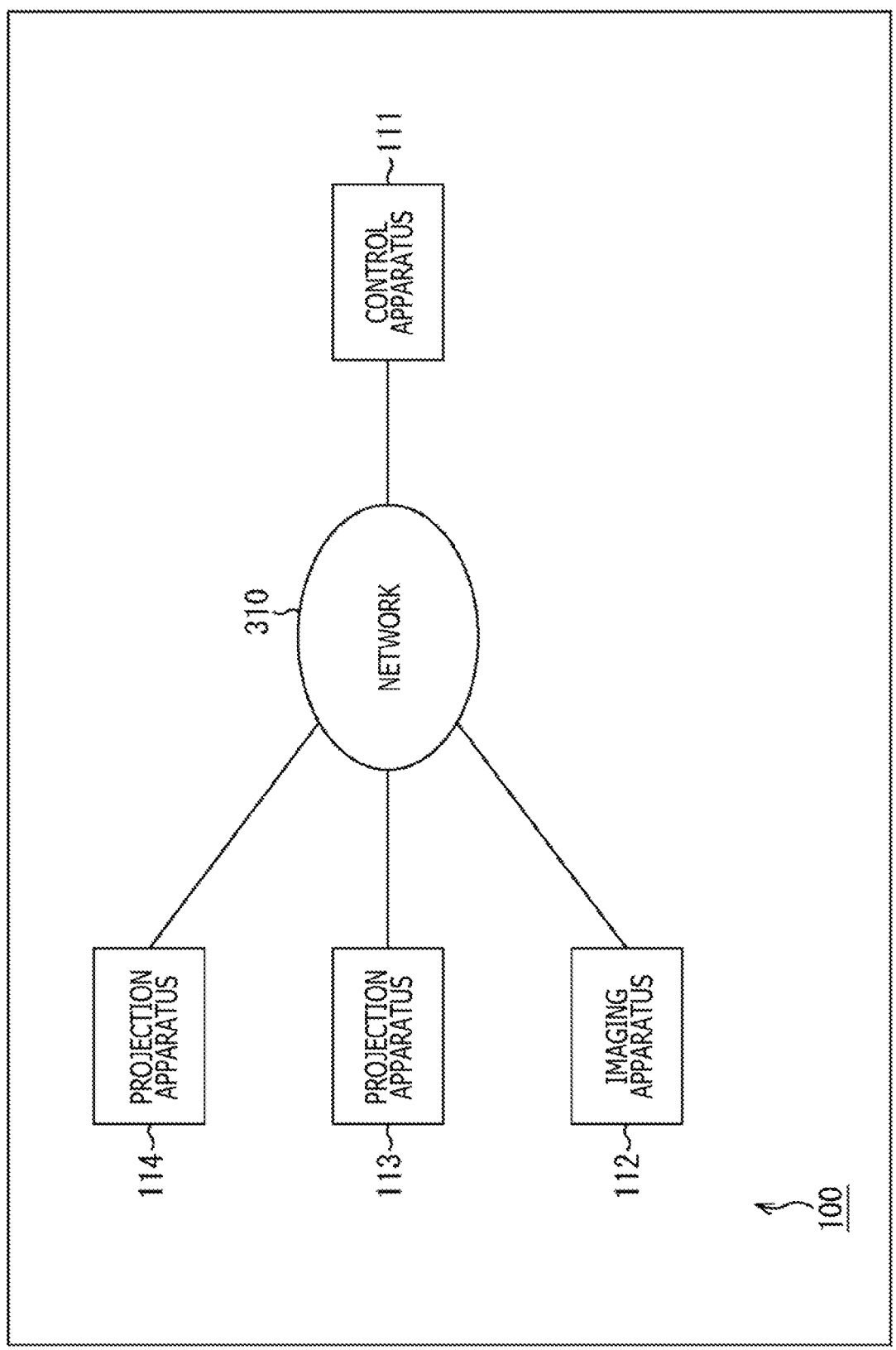
FIG. 9 is a block diagram illustrating a principal exemplary configuration of the image projection system.

Moreover, as illustrated, for example, in FIG. 9, the apparatuses included in the image projection system 100 may be interconnected through a network 310.

Any communication network may be used as the network 310. The network 310 may adopt any communication method. For example, the network 310 may adopt a wired communication method, a wireless communication method, or both. Further, the network 310 may include a single communication network or a plurality of communication networks. For example, the network 310 may include communication networks and communication paths compliant with any communication standard, such as the Internet, a public telephone network, a wireless mobile wide area communication network such as a so-called 3G or 4G line, a WAN (Wide Area Network), a LAN (Local Area Network), a wireless communication network compliant with the Bluetooth (registered trademark) standard, an NFC (Near Field Communication) or other short-range wireless communication path, an infrared communication path, and a wired communication network compliant, for example, with the HDMI (registered trademark) (High-Definition Multimedia Interface) or USB (Universal Serial Bus) standards.

The apparatuses are communicatively connected to the network 310. It should be noted that such connections may be wired connections (i.e., connections via wired communication), wireless connections (i.e., connections via wireless communication), or a combination of wire and wireless connections. The apparatuses are able to communicate with each other through the network 310 (e.g., transfer information to each other). Stated differently, the apparatuses may be intercommunicatively connected via other facilities (e.g., apparatuses and transmission paths). Even in a case where the above-described configuration is employed, the present technology is applicable to the image projection system 100, as is the case with the above-described other embodiments, so that the earlier-described operational advantages can be achieved.

Figure 10:
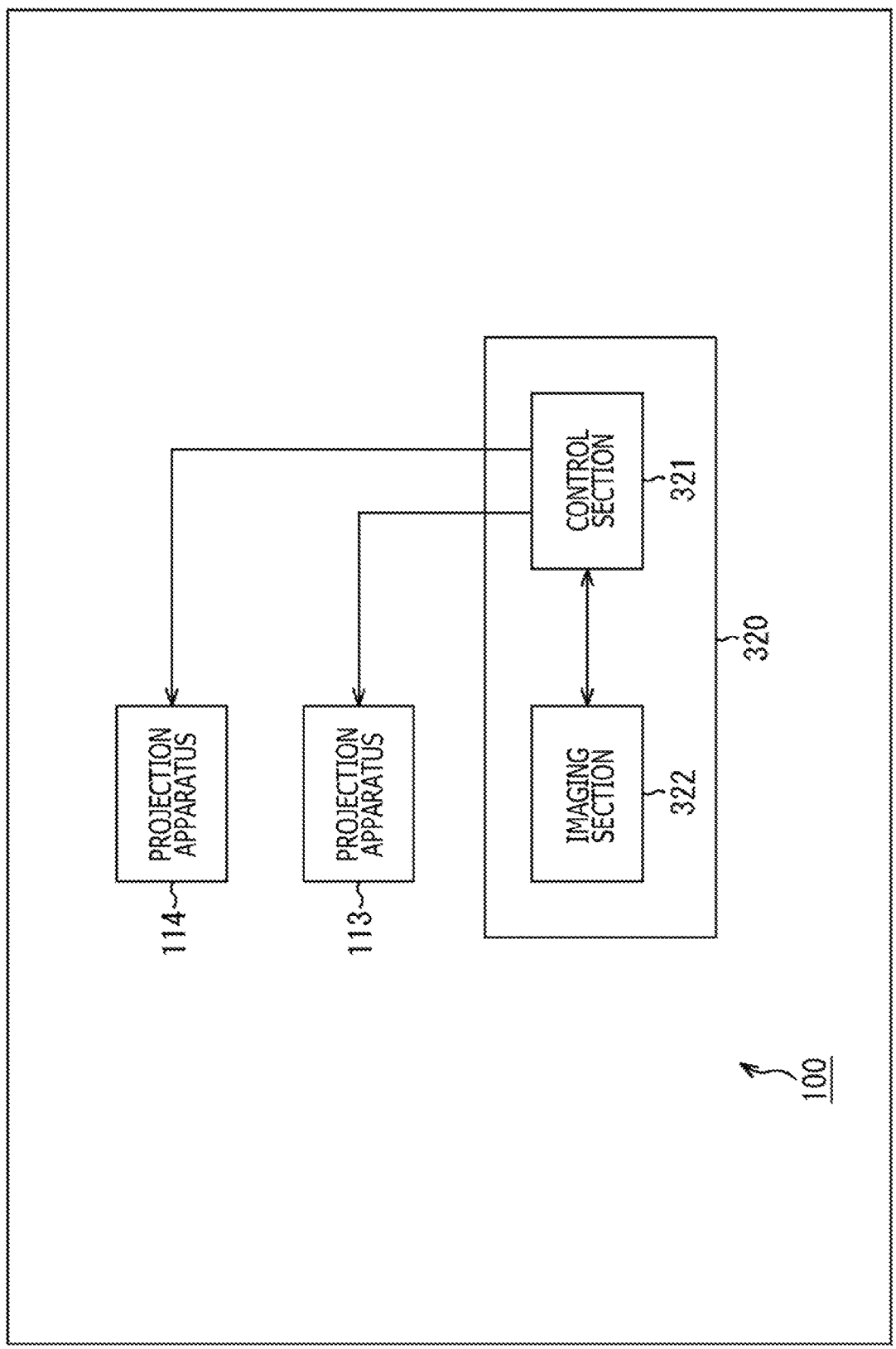
FIG. 10 is a block diagram illustrating a principal exemplary configuration of the image projection system.

Further, as illustrated, for example, in FIG. 10, the control apparatus 111 and the imaging apparatus 112 may be integrated into a single apparatus. In the example of FIG. 10, the image projection system 100 includes an imaging apparatus 320 instead of the control apparatus 111 and the imaging apparatus 112. The imaging apparatus 320 includes a control section 321 and an imaging section 322. The control section 321 is a processing section that performs a process related to synchronization control, has the similar configuration to the control apparatus 111, and performs the similar processing to the control apparatus 111. Meanwhile, the imaging section 322 is a processing section that performs a process related to imaging, has the similar configuration to the imaging apparatus 112, and performs the similar processing to the imaging apparatus 112. As illustrated in FIG. 10, the projection apparatus 113 and the projection apparatus 114 are connected to the control section 321, as is the case with the projection apparatus 113 and projection apparatus 114 connected to the control apparatus 111. The control section 321 controls the synchronization between the projection apparatus 113 and the projection apparatus 114 in accordance with a captured image captured by the imaging section 322. Consequently, even in a case where the above-described configuration is employed, the present technology is applicable to the image projection system 100 so that the earlier-described operational advantages can be achieved.

Figure 11:
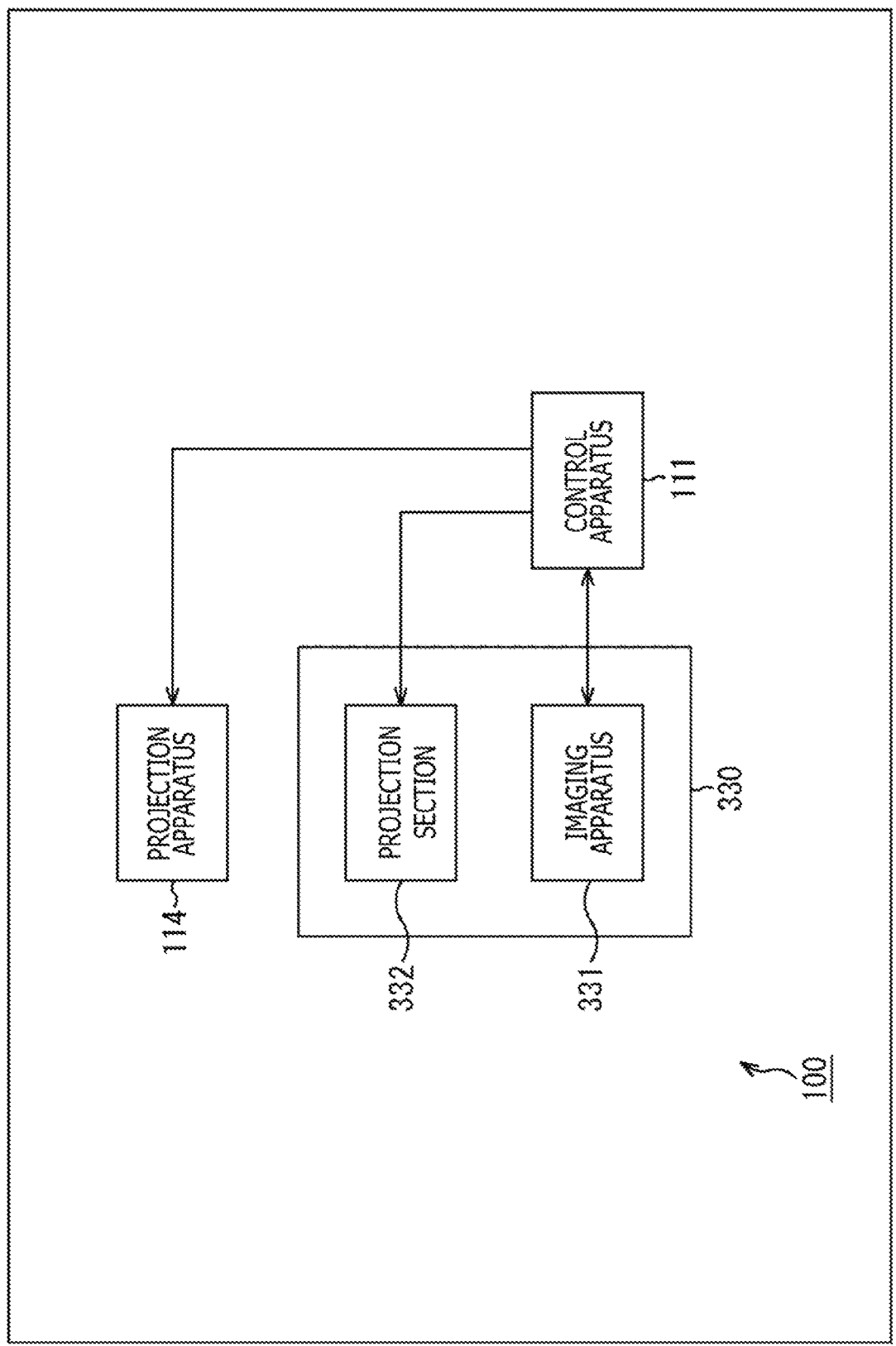
FIG. 11 is a block diagram illustrating a principal exemplary configuration of the image projection system.

Furthermore, as illustrated, for example, in FIG. 11, the imaging apparatus 112 and the projection apparatus 113 may be integrated into a single apparatus. In the example of FIG. 11, the image projection system 100 includes a projection imaging apparatus 330 instead of the imaging apparatus 112 and the projection apparatus 113. The projection imaging apparatus 330 includes an imaging section 331 and a projection section 332. The imaging section 331 is a processing section that performs a process related to imaging, has the similar configuration to the imaging apparatus 112, and performs the similar processing to the imaging apparatus 112. The projection section 332 is a processing section that performs a process related to image projection, has the similar configuration to the projection apparatus 113, and performs the similar processing as the projection apparatus 113. As illustrated in FIG. 11, the projection imaging apparatus 330 is also connected to the control apparatus 111. The control apparatus 111 controls the synchronization between the projection section 332 and the projection apparatus 114 in accordance with a captured image captured by the imaging section 331. Consequently, even in a case where the above-described configuration is employed, the present technology is applicable to the image projection system 100 so that the earlier-described operational advantages can be achieved.

Figure 12:
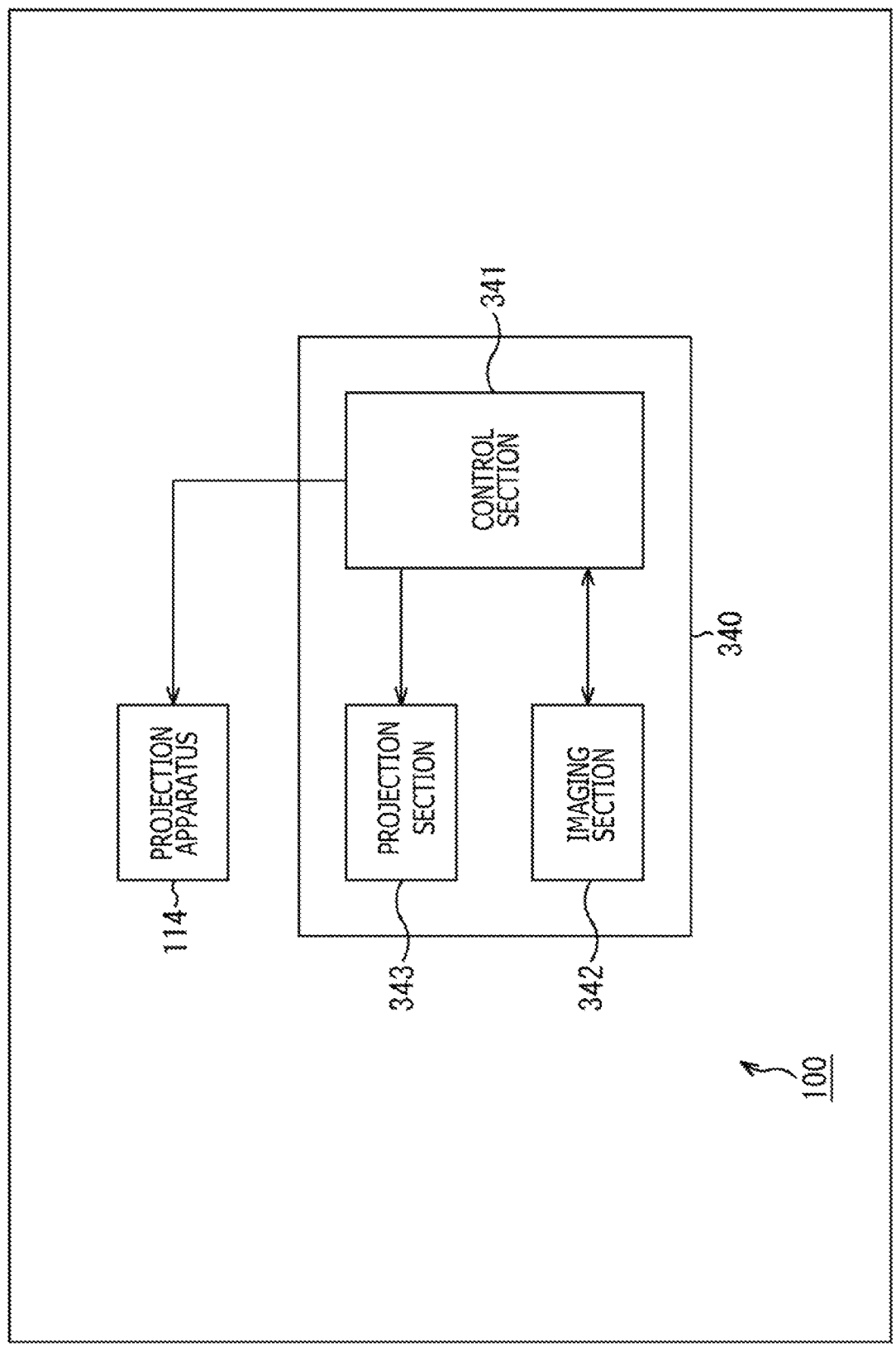
FIG. 12 is a block diagram illustrating a principal exemplary configuration of the image projection system.

Moreover, as illustrated in the example of FIG. 12, the control apparatus 111 may also be integrated. In the example of FIG. 12, the image projection system 100 includes a projection imaging apparatus 340 instead of the control apparatus 111, the imaging apparatus 112, and the projection apparatus 113. The projection imaging apparatus 340 includes a control section 341, an imaging section 342, and a projection section 343. The control section 341 is a processing section that performs a process related to synchronization control, has the similar configuration to the imaging apparatus 111, and performs the similar processing to the imaging apparatus 111. The imaging section 342 is a processing section that performs a process related to imaging, has the similar configuration to the imaging apparatus 112, and performs the similar processing to the imaging apparatus 112. The projection section 343 is a processing section that performs a process related to image projection, has the similar configuration to the projection apparatus 113, and performs the similar processing to the projection apparatus 113. As illustrated in FIG. 12, the projection apparatus 114 is connected to the control section 341, as is the case with the projection apparatus 114 connected to the control apparatus 111. The control section 341 controls the synchronization between the projection section 343 and the projection apparatus 114 in accordance with a captured image captured by the imaging section 342. Consequently, even in a case where the above-described configuration is employed, the present technology is applicable to the image projection system 100 so that the earlier-described operational advantages can be achieved.

Obviously, the apparatuses in the image projection system 100 are not limited to the above-described examples. Any combination of the apparatuses may be integrated into a single apparatus.

Further, the present technology has been described with reference to a case where it is applied to an image projection system. However, the present technology is also applicable to any configuration, for example, of an image display apparatus or image display system that has functions of displaying images or performing an image display process.

5. Other

Fields of Application of Present Technology

The present technology is applicable, for example, to systems, apparatuses, and processing sections used in any of various fields such as transportation, medical treatment, crime prevention, agriculture, stock raising, mining, beauty care, manufacture, home appliances, meteorology, and nature monitoring, as far as they are ones concerning processing images.

For example, the present technology is also applicable to systems and devices that are used for appreciation. Further, the present technology is also applicable, for example, to systems and devices that are used for traffic management. Furthermore, the present technology is also applicable, for example, to systems and devices that are used for security. Moreover, the present technology is also applicable, for example, to systems and devices that are used for sports. Additionally, the present technology is also applicable, for example, to systems and devices that are used for agriculture. Besides, the present technology is also applicable, for example, to systems and devices that are used for stock raising. In addition, the present technology is also applicable, for example, to systems and devices that are used to monitor the state of nature such as the state of volcanoes, forests, and oceans. Likewise, the present technology is applicable, for example, to meteorological observation systems and apparatuses used for the observation, for example, of weather, temperature, humidity, wind velocity, and daylight hours. By the same token, the present technology is also applicable, for example, to systems and devices used for observing the ecology of wildlife such as birds, fish, reptiles, amphibians, mammals, insects, and plants.

Software

The above-described series of processes may be performed by hardware or by software. Further, some processes may be performed by hardware, and the other processes may be performed by software. When the series of processes is to be performed by software, programs forming the software are installed on a computer. Here, the computer may be a computer incorporated in dedicated hardware or, for example, a general-purpose personal computer that is capable of executing various functions when various programs are installed.

Figure 13:
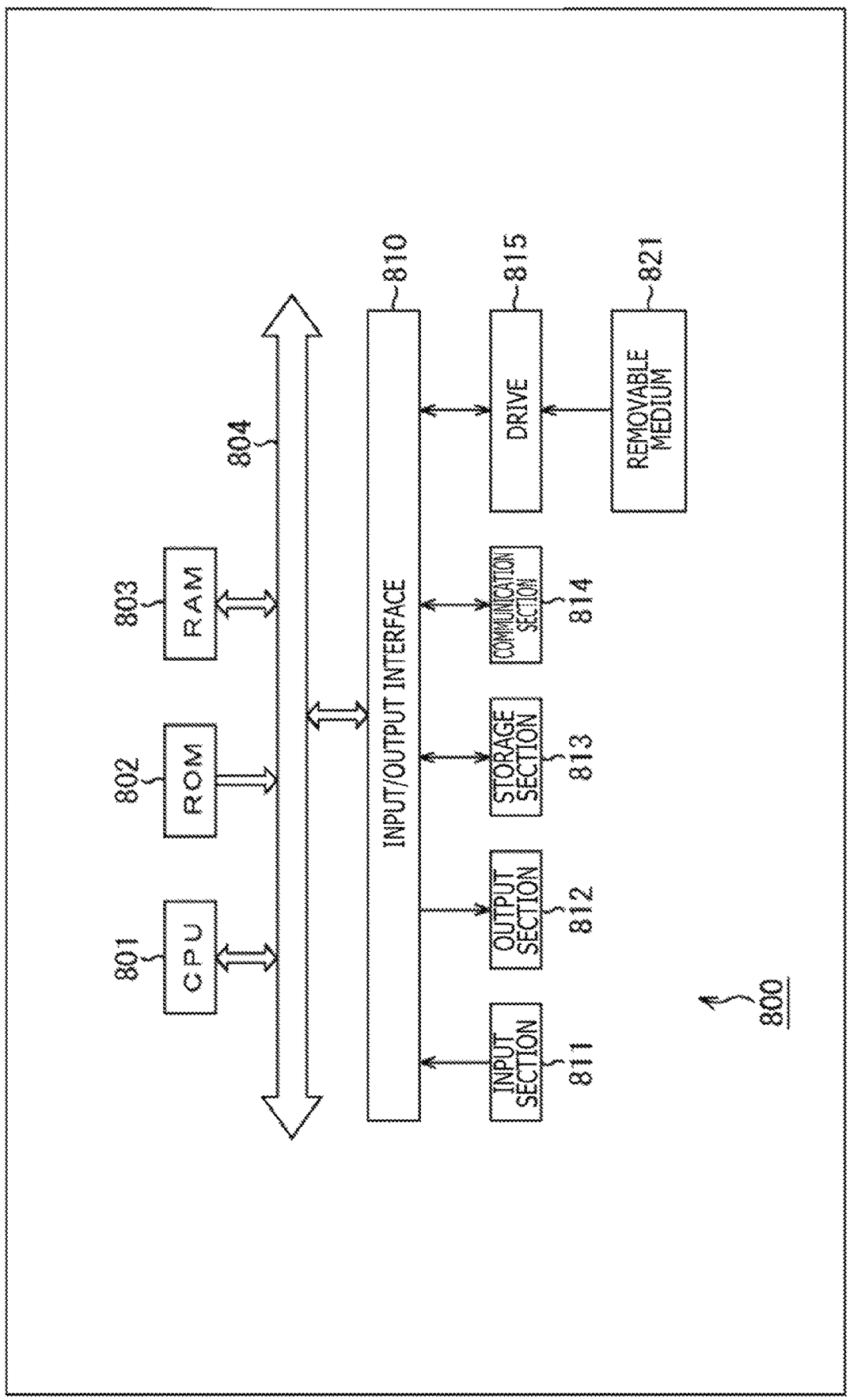
FIG. 13 is a block diagram illustrating a principal exemplary configuration of a computer.

FIG. 13 is a block diagram illustrating an exemplary hardware configuration of a computer that executes programs so as to perform the above-described series of processes.

In a computer 800 illustrated in FIG. 13, a CPU (Central Processing Unit) 801, a ROM (Read Only Memory) 802, a RAM (Random Access Memory) 803 are interconnected through a bus 804.

An input/output interface 810 is also connected to the bus 804. The input/output interface 810 is connected to an input section 811, an output section 812, a storage section 813, a communication section 814, and a drive 815.

The input section 811 includes, for example, a keyboard, a mouse, a microphone, a touch panel, and an input terminal. The output section 812 includes, for example, a display, a speaker, and an output terminal. The storage section 813 includes, for example, a hard disk, a RAM disk, and a nonvolatile memory. The communication section 814 includes, for example, a network interface. The drive 815 drives a removable medium such as a magnetic disk, an optical disk, a magneto-optical disk, or a semiconductor memory.

In the computer configured as described above, the CPU 801 performs the above-described series of processes by loading a program stored, for example, in the storage section 813 into the RAM 803 through the input/output interface 810 and the bus 804 and executing the loaded program. The RAM 803 also stores, as needed, data necessary for allowing the CPU 801 to perform various processes.

The program to be executed by the computer (CPU 801) may be recorded on a package medium or other removable medium 821 and then applied. In such a case, the program may be installed in the storage section 813 through the input/output interface 810 by inserting the removable medium 821 into the drive 815. Further, the program may be supplied through a wired or wireless transmission medium such as a local area network, the Internet, or a digital satellite broadcast. In such a case, the program may be received by the communication section 814 and installed in the storage section 813. Moreover, the program may be pre-installed in the ROM 802 or in the storage section 813.

Supplementary Notes

Embodiments of the present technology are not limited to the foregoing embodiment. The foregoing embodiments may be variously modified without departing from the spirit and scope of the present technology.

For example, the present technology may be implemented as a set (i.e., a partial configuration of an apparatus) that is obtained by adding additional functions to all elements included in an apparatus or a system, such as a processor acting as a system LSI (large-scale integration), a module using a plurality of processors, and a unit using a plurality of modules.

It should be noted that the term "system" used in this document denotes a set of a plurality of component elements (apparatuses, modules (parts), etc.). It does not matter whether all the component elements are housed in the same housing. Therefore, the term "system" represents, for example, not only a plurality of apparatuses housed in different housings and connected through a network, but also a single apparatus including a plurality of modules housed in a single housing.

Further, the above-described processing sections may be implemented by using any configuration as far as they have the above-described functions of the processing sections. For example, the above-described processing sections may include an appropriate circuit, LSI, system LSI, processor, module, unit, set, device, apparatus, or system. Furthermore, the processing sections may include a combination of these elements. For example, the above-described processing sections may include a combination of elements of the same type such as a plurality of pieces of a circuit or a plurality of pieces of a processor, or include a combination of elements of different types such as a combination of a circuit and an LSI.

Moreover, a configuration described as a single apparatus (or a single processing section) may be divided and configured as a plurality of apparatuses (or a plurality of processing sections). Conversely, configurations described above as a plurality of apparatuses (or a plurality of processing sections) may be combined and configured as a single apparatus (or a single processing section). Further, a configuration other than described above may be added to the configuration of each apparatus (or each processing section). Furthermore, as far as the configuration and operations of the whole system substantially remain unchanged, a part of the configuration of a certain apparatus (or a certain processing section) may be included in the configuration of another apparatus (or another processing section).

Moreover, the present technology may be applied to a cloud computing configuration in which a single function is shared and cooperatively processed over a network by a plurality of apparatuses.

Additionally, for example, the above-mentioned program may be executed by any apparatus. In such a case, the apparatus for executing the above-mentioned program should have necessary functions (e.g., functional blocks) and be able to acquire necessary information.

Besides, the steps described with reference to the foregoing flowcharts may be not only performed by a single apparatus, but also shared and performed by a plurality of apparatuses. Likewise, in a case where a plurality of processes is included in a single step, the plurality of processes included in the single step may be not only performed by a single apparatus, but also shared and performed by a plurality of apparatuses. More specifically, a plurality of processes included in a single step may be performed as processes in a plurality of steps. Conversely, processes described in conjunction with a plurality of steps may be combined and performed as a single step.

The program to be executed by the computer may be such that processes in the steps describing the program are performed chronologically in the order described in this document, performed parallelly, or performed individually at a necessary timing when, for example, a call is made. More specifically, the processes in the individual steps may be performed in an order different from the above-described order as far as no contradiction arises. Further, the processes in the steps describing the program may be performed in parallel with or in combination with the processes in another program.

A plurality of pieces of the present technology described in this document may be implemented independently on an individual basis as far as no contradiction arises. Obviously, any of the plurality of pieces of the present technology may be implemented in combination. For example, a part or whole of the present technology described in conjunction with a certain embodiment may be implemented in combination with a part or whole of the present technology described in conjunction with another embodiment. Further, a part of whole of any present technology described above may be implemented in combination with a different technology not described above.

It should be noted that the present technology may further adopt the following configurations.

(1) An image processing apparatus including: a synchronization control section that controls synchronization between a plurality of projection sections in such a manner as to suppress disruption of image projection timing between the projection sections in accordance with pixel values of captured images that are obtained by allowing an imaging section to capture projection images projected to the same position by the projection sections.

(2) The image processing apparatus as described in (1), in which the synchronization control section controls the synchronization between the plurality of projection sections in such a manner as to maximize, in the captured images captured by the imaging section in synchronization with one of the projection sections, absolute values of embedded values contained in the projected images onto which a positive value and a negative value are alternately projected by another projection section among the plurality of projection sections.

(3) The image processing apparatus as described in (1), in which, in the captured images captured by the imaging section, the synchronization control section controls the synchronization between the projection sections in such a manner as to minimize a difference between the projected images and a result of combination of a plurality of projected images containing different pattern images.

(4) The image processing apparatus as described in any one of (1) to (3), further including:

a calculation section that calculates a value of a parameter representing the disruption of image projection timing between the projection sections in accordance with the pixel values of the captured images, in which the synchronization control section controls the synchronization between the projection sections in such a manner as to suppress the disruption of image projection timing between the projection sections in accordance with the value of the parameter that is calculated by the calculation section.

(5) The image processing apparatus as described in (4), in which the calculation section calculates a difference between the plurality of successively captured images as the parameter, and the synchronization control section controls the synchronization between the projection sections in such a manner as to maximize the difference calculated by the calculation section.

(6) The image processing apparatus as described in (4), in which the calculation section calculates, as the parameter, a difference between the projected images contained in the captured images and a result of combination of different pattern images projected by the plurality of projection sections, and the synchronization control section controls the synchronization between the projection sections in such a manner as to minimize the difference calculated by the calculation section.

(7) The image processing apparatus as described in (6), in which the calculation section calculates the result of combination by using captured images of projected images containing different pattern images.

(8) The image processing apparatus as described in any one of (1) to (7), further including:

an image processing section that performs image processing on images projected by the plurality of projection sections in order to control the synchronization between the projection sections, in which the synchronization control section is configured to control the synchronization between the projection sections in such a manner as to suppress the disruption of image projection timing between the projection sections in accordance with pixel values of the captured images subjected to image processing by the image processing section.

(9) The image processing apparatus as described in (8), in which the image processing section embeds a positive value and a negative value into the same image, and causes the projection sections to project an image having the positive embedded value and an image having the negative embedded value.

(10) The image processing apparatus as described in any one of (1) to (9), further including:

an imaging section that captures images of the projected images to acquire the captured images.

(11) The image processing apparatus as described in (10), in which the imaging section synchronizes with one of the plurality of projection sections and acquires the captured images by making an exposure during a period of image projection by the projection sections.

(12) The image processing apparatus as described in (10), in which the imaging section acquires the captured images by making an exposure for a period having the same duration as the period of image projection by the projection sections.

(13) The image processing apparatus as described in (12), in which the imaging section captures an image of each of projected images containing a plurality of different pattern images used for synchronization control by the synchronization control section.

(14) The image processing apparatus as described in any one of (1) to (13), further including:

a projection section that projects an image.

(15) The image processing apparatus as described in (14), in which the projection section alternately projects an image having a positive embedded value and an image having a negative embedded value.

(16) The image processing apparatus as described in (14), in which the projection section sequentially projects a plurality of pattern images.

(17) The image processing apparatus as described in (16), in which the projection section projects each of the plurality of pattern images and causes the imaging section to capture each projected image before sequentially projecting the plurality of pattern images.

(18) An image processing method that controls synchronization between a plurality of projection sections in such a manner as to suppress disruption of image projection timing between the projection sections in accordance with pixel values of captured images that are obtained by allowing an imaging section to capture projection images projected to the same position by the projection sections.

REFERENCE SIGNS LIST

100 . . . Image projection system, 111 . . . Control apparatus, 112 . . . Imaging apparatus, 113, 114 . . . Projection apparatus, 121 . . . Synchronization amount extraction section, 122 . . . Synchronization image processing section, 123 . . . Synchronization adjustment processing section, 131 ... Imaging section, 132 ... Captured-image processing section, 141 ... Projection image processing section, 142 ... Projection section, 151 ... Projection image processing section, 152 ... Projection section, 153 ... Output synchronization adjustment section, 310 ... Network, 320 ... Imaging apparatus, 321 ... Control section, 322 ... Imaging section, 330 ... Projection imaging apparatus, 331 ... Imaging section, 332 ... Projection section, 340 ... Projection imaging apparatus, 341 ... Control section, 342 ... Imaging section, 343 ... Projection section, 800 ... Computer

The invention claimed is:

1. An image processing apparatus, comprising:
a plurality of projectors configured to project first projection images to a specific position;
an image sensor configured to capture the first projection images projected by the plurality of projectors; and
circuitry configured to;
calculate a value of a parameter based on pixel values of the captured first projection images, wherein the parameter corresponds to disruption of image projection timing between the plurality of projectors;
set a time of image projection by a first projector of the plurality of projectors, wherein the time of image projection is set based the calculated value of the parameter; and
control synchronization between the plurality of projectors to suppress the disruption of image projection timing between the plurality of projectors wherein the synchronization between the plurality of projectors is controlled based on the set time of image projection by the first projector.

2. The image processing apparatus according to claim 1, wherein
the image sensor is further configured to capture the first projection images in synchronization with a specific second projector of the plurality of projectors,
the first projector is different from the second projector, and
the circuitry is further configured to control the synchronization between the plurality of projectors to maximize absolute values of embedded values contained in the first projection images.

3. The image processing apparatus according to claim 1, wherein
one projector of the plurality of projectors is configured to project second projection images that include different pattern images, and
the circuitry is further configured to control the synchronization between the plurality of projectors to minimize a difference between the pixel values of the first projection images and pixel values of the second projection images.

4. The image processing apparatus according to claim 1, wherein
the plurality of projectors is further configured to project third projection images subsequent to the projection of the first projection images,
the image sensor further configured to capture the third projection images,
the circuitry is further configured to:
calculate a difference between the pixel values of the first projection images and pixel values of the third projection images, wherein the parameter corresponds to the difference between the pixel values of first projection images and the pixel values of the third projection images, and
control the synchronization between the plurality of projectors to maximize the calculated difference.

5. The image processing apparatus according to claim 1, wherein
one projector of the plurality of projectors is configured to project second projection images, wherein the second projection images includes different pattern images,
the circuitry is further configured to:
calculate, as the parameter, a difference between the pixel values of the first projection images and pixel values of the second projection images, and
control the synchronization between the plurality of projectors to minimize the calculated difference.

6. The image processing apparatus according to claim 5, wherein the circuitry is further configured to calculate the pixel values of the second projection images based on a respective pixel value of each of the second projection images.

7. The image processing apparatus according to claim 1, wherein the circuitry is further configured to process the first projection images to control the synchronization between the plurality of projectors.

8. The image processing apparatus according to claim 7, wherein
the circuitry is further configured to:
embed a positive value into a first image of the first projection images; and
embed a negative value into a second image of the first projection images,
and
one of the plurality of projectors is further configured to project the first image having the positive embedded value and the second image having the negative embedded value.

9. The image processing apparatus according to claim 1, wherein the image sensor is further configured to:
synchronize with one of the plurality of projectors; and
capture the first projection images based on an exposure for a specific period, wherein the specific period corresponds to a period of image projection of the synchronized one of the plurality of projectors.

10. The image processing apparatus according to claim 1, wherein
the image sensor is further configured to capture the first projection images based on an exposure for a specific period, and
the specific period corresponds to a period of image projection by the plurality of projectors.

11. The image processing apparatus according to claim 1, wherein
one of the plurality of projectors is configured to alternately project a first image of the first projection images and a second image of the first projection images, and
the first image has a positive embedded value and the second image has a negative embedded value.

12. The image processing apparatus according to claim 1, wherein one of the plurality of projectors is configured to sequentially project a plurality of pattern images.

13. The image processing apparatus according to claim 12, wherein the image sensor is further configured to capture each of the projected plurality of pattern images.

14. An image processing method, comprising:
projecting projection images to a specific position, wherein the projection images are projected by a plurality of projectors;
capturing the projection images projected by the plurality of projectors;

calculating a value of a parameter based on pixel values of the captured projection images, wherein the parameter corresponds to disruption of image projection timing between the plurality of projectors;

setting a time of image projection by a first projector of the plurality of projectors, wherein the time of image projection is set based the calculated value of the parameter; and controlling synchronization between the plurality of projectors to suppress the disruption of image projection timing between the plurality of projectors, wherein the synchronization between the plurality of projectors is controlled based on the set time of image projection by the first projector.

* * * * *